US012626343B2

(12) United States Patent
McCall et al.

(10) Patent No.: US 12,626,343 B2
(45) Date of Patent: May 12, 2026

(54) ENHANCED DETECTION OR REPAIR OF UNWANTED REFLECTION ARTIFACTS IN DIGITAL IMAGES

(71) Applicant: Apple Inc., Cupertino, CA (US)

(72) Inventors: Brian P. McCall, San Jose, CA (US);
Todd G. Bell, Capitola, CA (US);
Andrew K. McMahon, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 327 days.

(21) Appl. No.: 18/476,631

(22) Filed: Sep. 28, 2023

(65) Prior Publication Data

US 2025/0111488 A1    Apr. 3, 2025

(51) Int. Cl.
*G06T 5/80* (2024.01)
*G06T 5/50* (2006.01)
*G06T 7/70* (2017.01)

(52) U.S. Cl.
CPC .................. *G06T 5/80* (2024.01); *G06T 5/50* (2013.01); *G06T 7/70* (2017.01)

(58) Field of Classification Search
None
See application file for complete search history.

(56) References Cited

U.S. PATENT DOCUMENTS 9,020,281 B2    4/2015    Yamashita
9,900,503 B1 *   2/2018    Bedi .................... H04N 23/741

2011/0182520 A1    7/2011    Free
2018/0134127 A1 *   5/2018    Winn ......................... G06T 5/77
2020/0234414 A1 *   7/2020    Zamir ...................... G06N 3/09

FOREIGN PATENT DOCUMENTS

| | | | | |
|---|---|---|---|---|
| CN | 112102182 A | * | 12/2020 | ............. G06N 3/045 |
| CN | 113168670 A | * | 7/2021 | ............. H04N 23/64 |
| CN | 113763528 A | | 12/2021 | |
| CN | 116091334 A | * | 5/2023 | .......... G06N 3/0475 |
| DE | 102013115000 A1 | * | 7/2014 | ............. G06T 5/50 |
| JP | 2008289034 A | | 11/2008 | |
| KR | 20220159852 A | * | 7/2020 | .......... H04M 1/0264 |
| WO | WO-2012110894 A1 | * | 8/2012 | ............. G06T 5/50 |

* cited by examiner

*Primary Examiner* — David Ometz
(74) *Attorney, Agent, or Firm* — Blank Rome LLP

(57) ABSTRACT

Devices, methods, and non-transitory computer readable media are disclosed herein to repair or mitigate the appearance of unwanted reflection artifacts in captured video image streams. These unwanted reflection artifacts often present themselves as brightly-colored spots that reflect the shape of a bright light source in the captured image. These artifacts, also referred to herein as "green ghosts" (due to often having a greenish tint), are typically located in regions of the captured images where there is not actually a bright light source located in the image. In fact, such unwanted reflection artifacts often present themselves on the image sensor across the principal point of the lens from where the actual bright light source in the captured image is located. Such devices, methods and computer readable media may be configured to detect, track, and repair such unwanted reflection artifacts in an intelligent fashion, e.g., leveraging images captured with varying exposure settings.

36 Claims, 12 Drawing Sheets

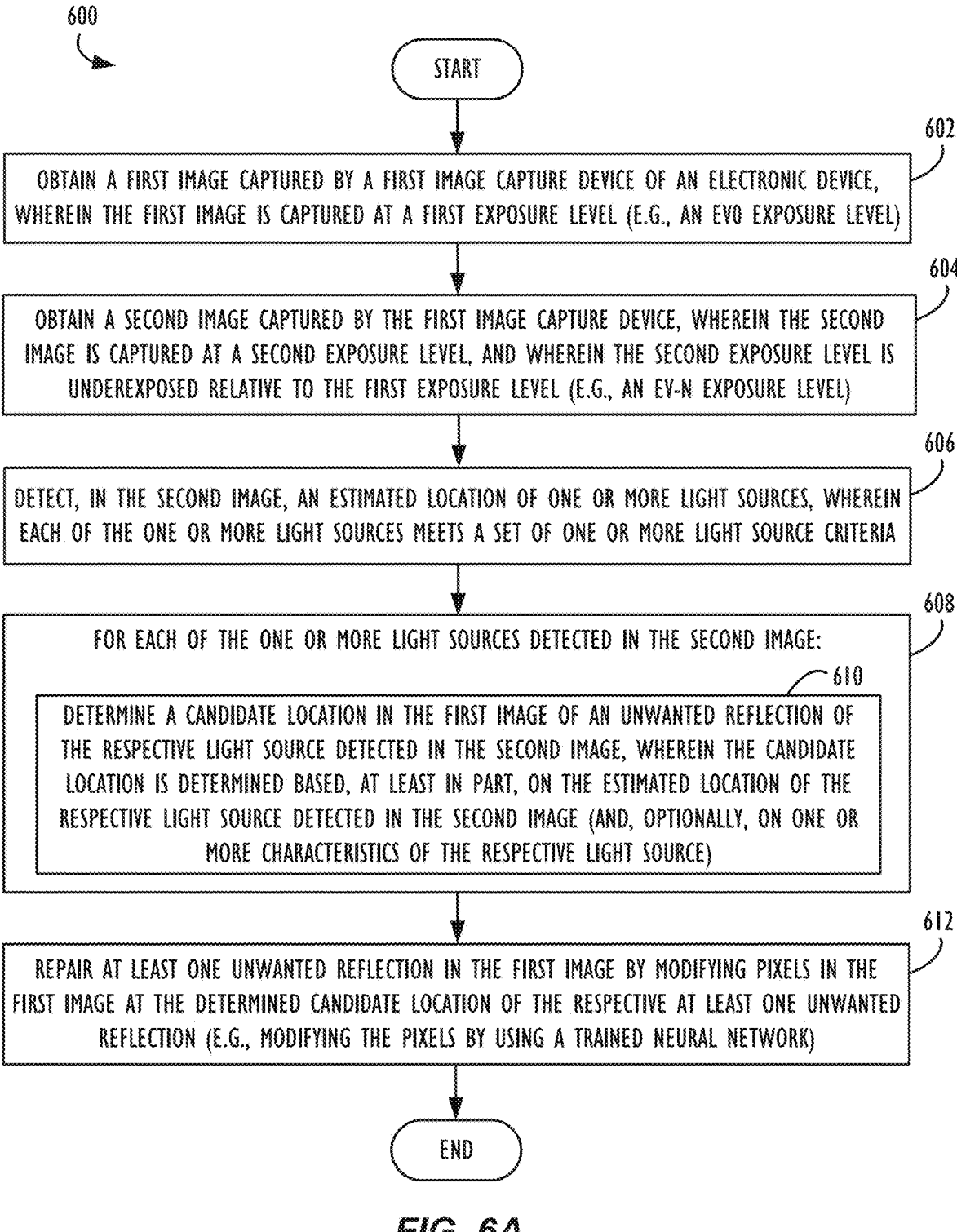

600

START

602
OBTAIN A FIRST IMAGE CAPTURED BY A FIRST IMAGE CAPTURE DEVICE OF AN ELECTRONIC DEVICE, WHEREIN THE FIRST IMAGE IS CAPTURED AT A FIRST EXPOSURE LEVEL (E.G., AN EV0 EXPOSURE LEVEL)

604
OBTAIN A SECOND IMAGE CAPTURED BY THE FIRST IMAGE CAPTURE DEVICE, WHEREIN THE SECOND IMAGE IS CAPTURED AT A SECOND EXPOSURE LEVEL, AND WHEREIN THE SECOND EXPOSURE LEVEL IS UNDEREXPOSED RELATIVE TO THE FIRST EXPOSURE LEVEL (E.G., AN EV-N EXPOSURE LEVEL)

606
DETECT, IN THE SECOND IMAGE, AN ESTIMATED LOCATION OF ONE OR MORE LIGHT SOURCES, WHEREIN EACH OF THE ONE OR MORE LIGHT SOURCES MEETS A SET OF ONE OR MORE LIGHT SOURCE CRITERIA

608
FOR EACH OF THE ONE OR MORE LIGHT SOURCES DETECTED IN THE SECOND IMAGE:

610
DETERMINE A CANDIDATE LOCATION IN THE FIRST IMAGE OF AN UNWANTED REFLECTION OF THE RESPECTIVE LIGHT SOURCE DETECTED IN THE SECOND IMAGE, WHEREIN THE CANDIDATE LOCATION IS DETERMINED BASED, AT LEAST IN PART, ON THE ESTIMATED LOCATION OF THE RESPECTIVE LIGHT SOURCE DETECTED IN THE SECOND IMAGE (AND, OPTIONALLY, ON ONE OR MORE CHARACTERISTICS OF THE RESPECTIVE LIGHT SOURCE)

612
REPAIR AT LEAST ONE UNWANTED REFLECTION IN THE FIRST IMAGE BY MODIFYING PIXELS IN THE FIRST IMAGE AT THE DETERMINED CANDIDATE LOCATION OF THE RESPECTIVE AT LEAST ONE UNWANTED REFLECTION (E.G., MODIFYING THE PIXELS BY USING A TRAINED NEURAL NETWORK)

END

*FIG. 6A*

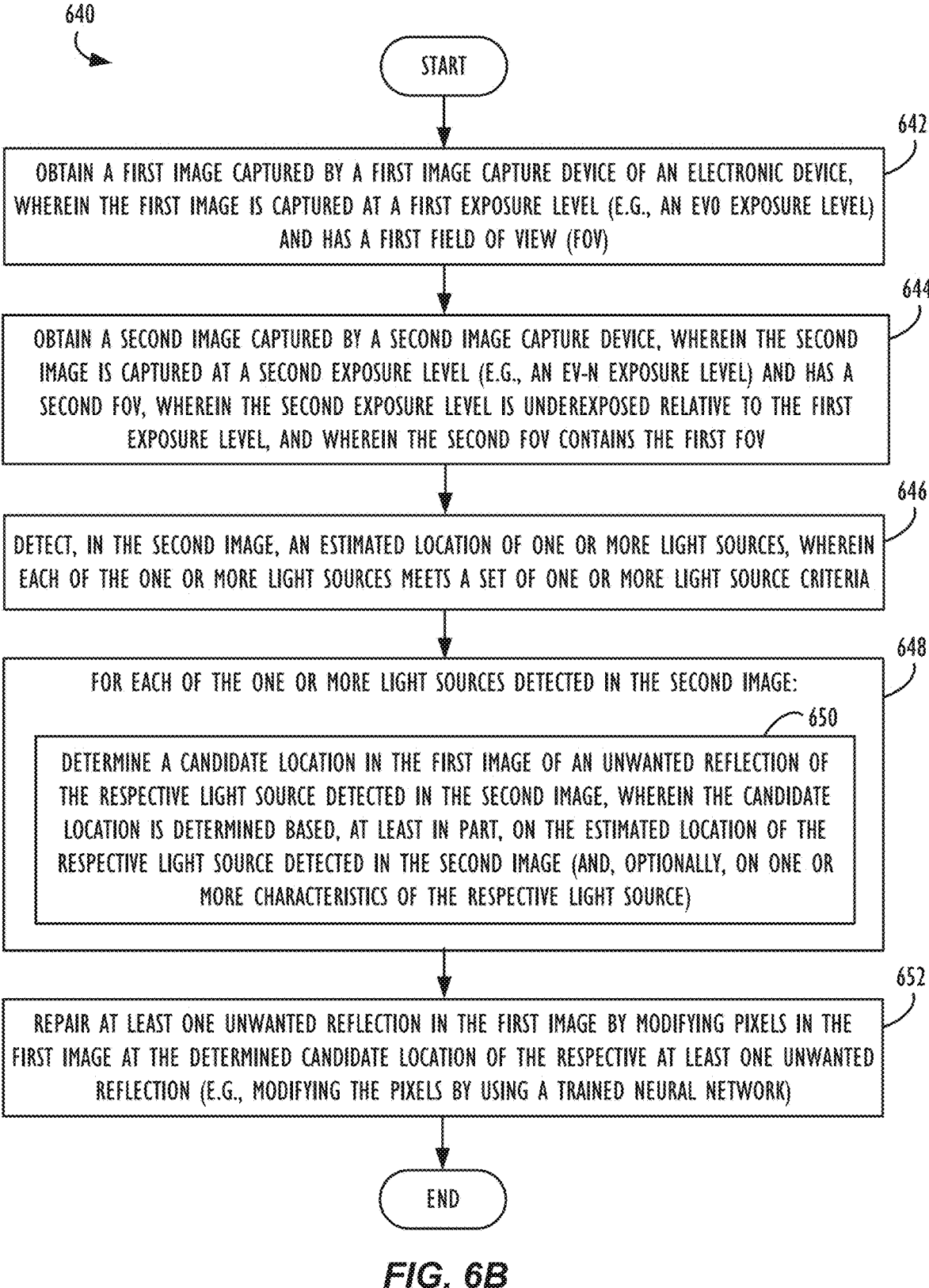

640

START

642

OBTAIN A FIRST IMAGE CAPTURED BY A FIRST IMAGE CAPTURE DEVICE OF AN ELECTRONIC DEVICE, WHEREIN THE FIRST IMAGE IS CAPTURED AT A FIRST EXPOSURE LEVEL (E.G., AN EV0 EXPOSURE LEVEL) AND HAS A FIRST FIELD OF VIEW (FOV)

644

OBTAIN A SECOND IMAGE CAPTURED BY A SECOND IMAGE CAPTURE DEVICE, WHEREIN THE SECOND IMAGE IS CAPTURED AT A SECOND EXPOSURE LEVEL (E.G., AN EV-N EXPOSURE LEVEL) AND HAS A SECOND FOV, WHEREIN THE SECOND EXPOSURE LEVEL IS UNDEREXPOSED RELATIVE TO THE FIRST EXPOSURE LEVEL, AND WHEREIN THE SECOND FOV CONTAINS THE FIRST FOV

646

DETECT, IN THE SECOND IMAGE, AN ESTIMATED LOCATION OF ONE OR MORE LIGHT SOURCES, WHEREIN EACH OF THE ONE OR MORE LIGHT SOURCES MEETS A SET OF ONE OR MORE LIGHT SOURCE CRITERIA

648

FOR EACH OF THE ONE OR MORE LIGHT SOURCES DETECTED IN THE SECOND IMAGE:

650

DETERMINE A CANDIDATE LOCATION IN THE FIRST IMAGE OF AN UNWANTED REFLECTION OF THE RESPECTIVE LIGHT SOURCE DETECTED IN THE SECOND IMAGE, WHEREIN THE CANDIDATE LOCATION IS DETERMINED BASED, AT LEAST IN PART, ON THE ESTIMATED LOCATION OF THE RESPECTIVE LIGHT SOURCE DETECTED IN THE SECOND IMAGE (AND, OPTIONALLY, ON ONE OR MORE CHARACTERISTICS OF THE RESPECTIVE LIGHT SOURCE)

652

REPAIR AT LEAST ONE UNWANTED REFLECTION IN THE FIRST IMAGE BY MODIFYING PIXELS IN THE FIRST IMAGE AT THE DETERMINED CANDIDATE LOCATION OF THE RESPECTIVE AT LEAST ONE UNWANTED REFLECTION (E.G., MODIFYING THE PIXELS BY USING A TRAINED NEURAL NETWORK)

END

*FIG. 6B*

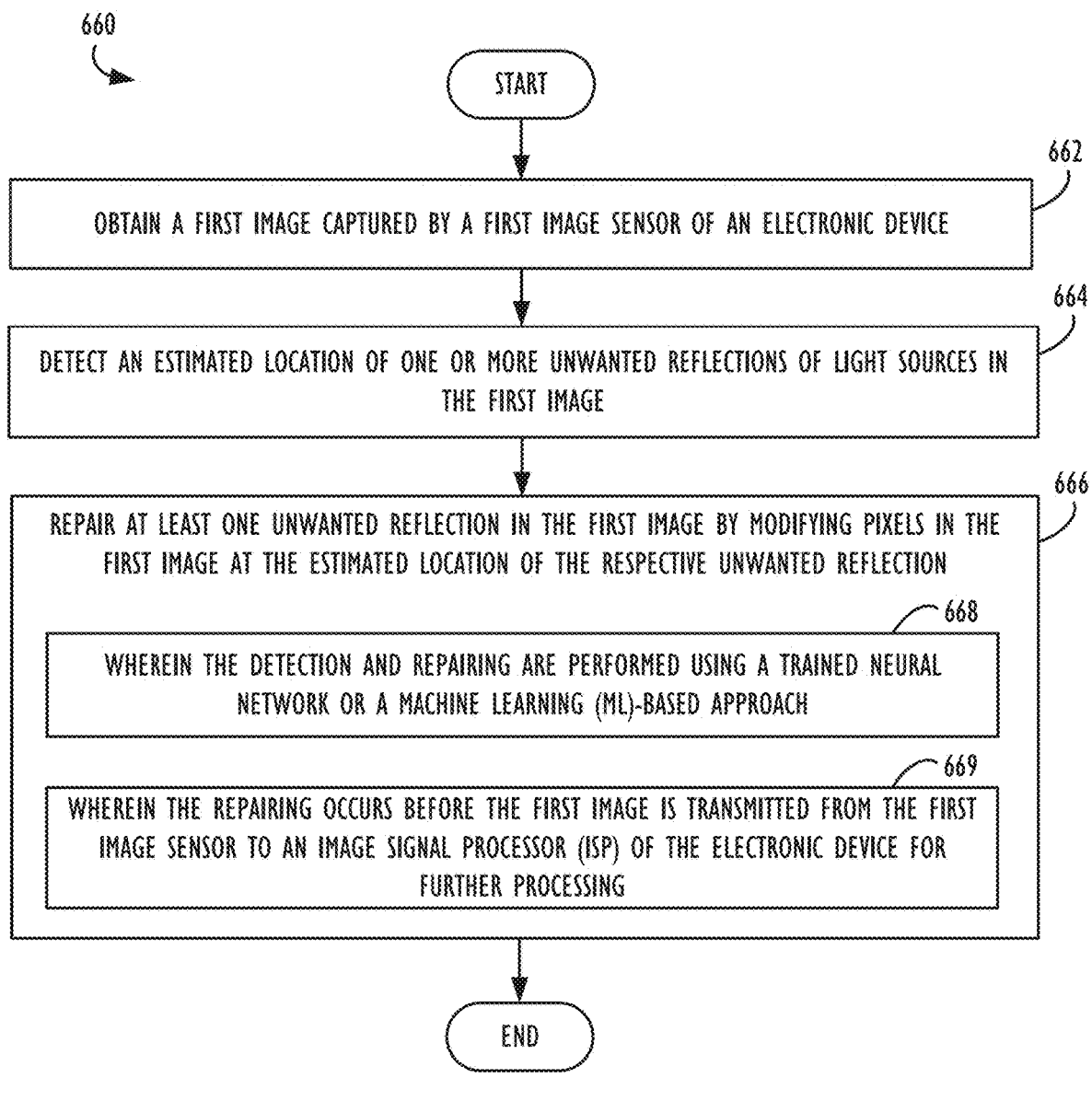

660

START

OBTAIN A FIRST IMAGE CAPTURED BY A FIRST IMAGE SENSOR OF AN ELECTRONIC DEVICE — 662

DETECT AN ESTIMATED LOCATION OF ONE OR MORE UNWANTED REFLECTIONS OF LIGHT SOURCES IN THE FIRST IMAGE — 664

REPAIR AT LEAST ONE UNWANTED REFLECTION IN THE FIRST IMAGE BY MODIFYING PIXELS IN THE FIRST IMAGE AT THE ESTIMATED LOCATION OF THE RESPECTIVE UNWANTED REFLECTION — 666

WHEREIN THE DETECTION AND REPAIRING ARE PERFORMED USING A TRAINED NEURAL NETWORK OR A MACHINE LEARNING (ML)-BASED APPROACH — 668

WHEREIN THE REPAIRING OCCURS BEFORE THE FIRST IMAGE IS TRANSMITTED FROM THE FIRST IMAGE SENSOR TO AN IMAGE SIGNAL PROCESSOR (ISP) OF THE ELECTRONIC DEVICE FOR FURTHER PROCESSING — 669

END

*FIG. 6C*

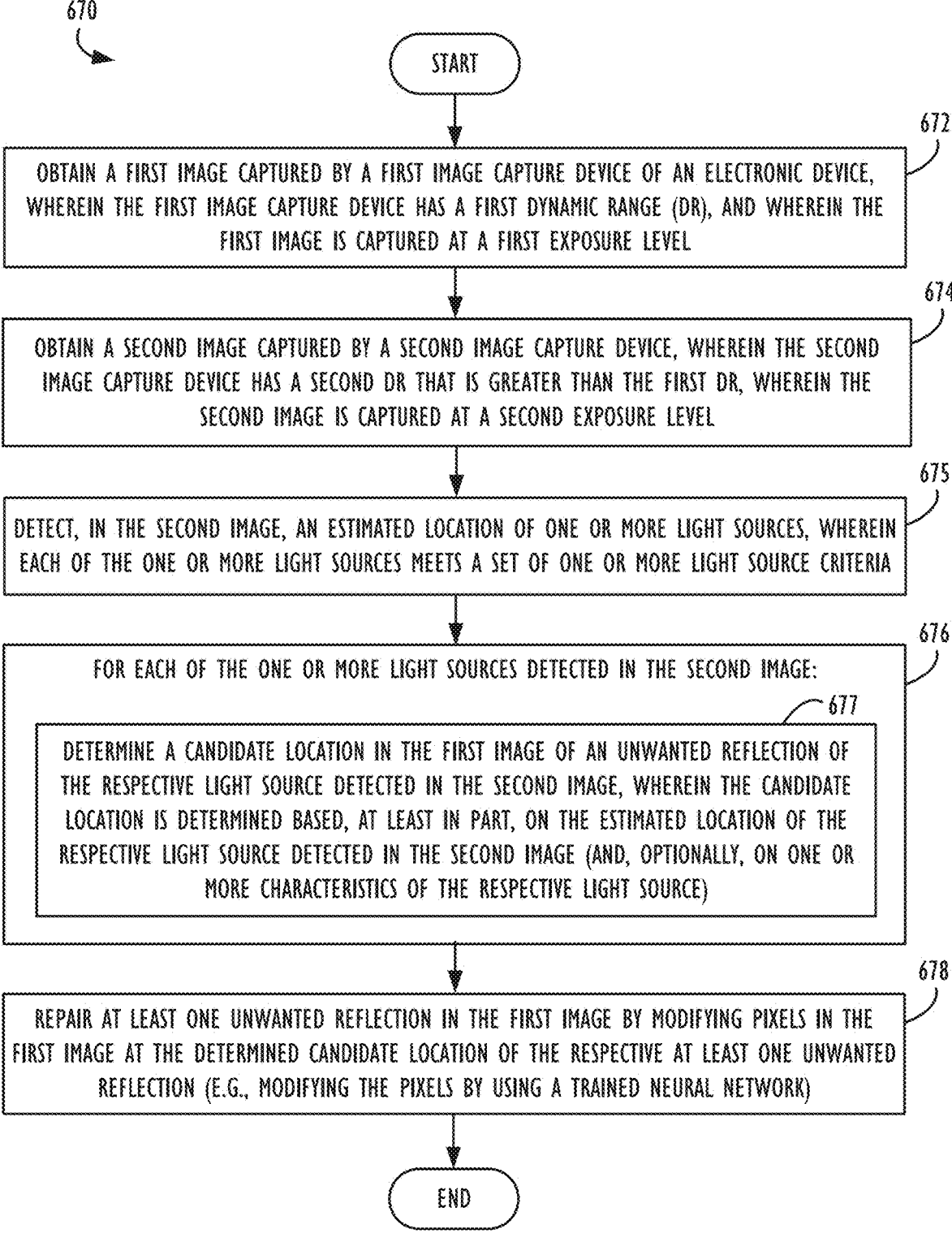

670

START

672

OBTAIN A FIRST IMAGE CAPTURED BY A FIRST IMAGE CAPTURE DEVICE OF AN ELECTRONIC DEVICE, WHEREIN THE FIRST IMAGE CAPTURE DEVICE HAS A FIRST DYNAMIC RANGE (DR), AND WHEREIN THE FIRST IMAGE IS CAPTURED AT A FIRST EXPOSURE LEVEL

674

OBTAIN A SECOND IMAGE CAPTURED BY A SECOND IMAGE CAPTURE DEVICE, WHEREIN THE SECOND IMAGE CAPTURE DEVICE HAS A SECOND DR THAT IS GREATER THAN THE FIRST DR, WHEREIN THE SECOND IMAGE IS CAPTURED AT A SECOND EXPOSURE LEVEL

675

DETECT, IN THE SECOND IMAGE, AN ESTIMATED LOCATION OF ONE OR MORE LIGHT SOURCES, WHEREIN EACH OF THE ONE OR MORE LIGHT SOURCES MEETS A SET OF ONE OR MORE LIGHT SOURCE CRITERIA

676

FOR EACH OF THE ONE OR MORE LIGHT SOURCES DETECTED IN THE SECOND IMAGE:

677

DETERMINE A CANDIDATE LOCATION IN THE FIRST IMAGE OF AN UNWANTED REFLECTION OF THE RESPECTIVE LIGHT SOURCE DETECTED IN THE SECOND IMAGE, WHEREIN THE CANDIDATE LOCATION IS DETERMINED BASED, AT LEAST IN PART, ON THE ESTIMATED LOCATION OF THE RESPECTIVE LIGHT SOURCE DETECTED IN THE SECOND IMAGE (AND, OPTIONALLY, ON ONE OR MORE CHARACTERISTICS OF THE RESPECTIVE LIGHT SOURCE)

678

REPAIR AT LEAST ONE UNWANTED REFLECTION IN THE FIRST IMAGE BY MODIFYING PIXELS IN THE FIRST IMAGE AT THE DETERMINED CANDIDATE LOCATION OF THE RESPECTIVE AT LEAST ONE UNWANTED REFLECTION (E.G., MODIFYING THE PIXELS BY USING A TRAINED NEURAL NETWORK)

END

FIG. 6D

ENHANCED DETECTION OR REPAIR OF UNWANTED REFLECTION ARTIFACTS IN DIGITAL IMAGES

TECHNICAL FIELD

This disclosure relates generally to the field of digital image processing. More particularly, but not by way of limitation, it relates to techniques for efficiently mitigating the appearance of unwanted reflection artifacts in video image streams.

BACKGROUND

The advent of portable integrated computing devices has caused a wide proliferation of cameras and other video capture-capable devices. These integrated computing devices commonly take the form of smartphones, tablets, or laptop computers, and typically include general purpose computers, cameras, sophisticated user interfaces including touch-sensitive screens, and wireless communications abilities through Wi-Fi, Bluetooth, LTE, HSDPA, New Radio (NR), and other cellular-based or wireless technologies. The wide proliferation of these integrated devices provides opportunities to use the devices' capabilities to perform tasks that would otherwise require dedicated hardware and software.

For example, integrated computing devices, such as smartphones, tablets, and laptop computers typically have one or more embedded cameras. These cameras generally amount to lens/camera hardware modules that may be controlled through the use of a general-purpose computer using firmware and/or software (e.g., "Apps") and a user interface, including touch-screen buttons, fixed buttons, and/or touchless controls, such as voice control. The integration of high-quality cameras into these integrated communication devices, such as smartphones, tablets, and laptop computers, has enabled users to capture and share images and videos in ways never before possible. It is now common for users' smartphones to be their primary image and video capture device of choice.

Cameras that are optimized for inclusion into integrated computing devices, and, particularly, into small or portable integrated computing devices, such as smartphones or tablets, may often face various constraints, e.g., processing power constraints, thermal constraints—and even physical size constraints—that cause manufacturers to make tradeoffs between using cameras with optimal image capture capabilities and those that will meet the constraints of the computing devices into which they are being integrated. In particular, unwanted artifacts may often appear in digital images captured by such integrated camera devices, e.g., due to the optics of the lenses used, sensor characteristics, and/or the aforementioned constraints faced by integrated image capture devices.

One type of artifact that will be discussed in greater detail herein is referred to as an unwanted reflection artifact. These unwanted reflection artifacts often present themselves as brightly-colored spots, circles, rings, or halos that reflect the shape of a bright light source in the captured image. These artifacts, also referred to herein as "ghosts" or "green ghosts" (due to often having a greenish tint), are typically located in regions of the captured images where there is not actually a bright light source located in the image. In fact, such unwanted reflection artifacts often present themselves on the image sensor at a location mirrored across the principal point of the lens from where the actual bright light source in the captured image is located. Moreover, the position of these artifacts can change rapidly and unexpectedly during the capture of a video image stream, e.g., due to user hand shake, intentional movement of the camera to capture different parts of a scene over time, changes to the camera's focus and/or zoom levels, and the like.

Thus, in order to repair or mitigate the appearance of these unwanted reflection artifacts in captured video image streams, it would be desirable to have methods and systems that detect, track, and repair such unwanted reflection artifacts in an intelligent and efficient fashion, e.g., using one or more cameras, whose exposure levels are manipulated in order to more efficiently and accurately detect unwanted reflection artifacts.

SUMMARY

Devices, methods, and non-transitory computer readable media are disclosed herein to repair or mitigate the appearance of unwanted reflection artifacts (also referred to herein as "ghosts" or "green ghosts") in captured video image streams. Such devices, methods and computer readable media may be configured to detect, track, and repair such unwanted reflection artifacts in an intelligent (e.g., machine learning-enabled) and efficient fashion.

In particular, according to some embodiments, rather than obtaining saturated images of the light sources producing the so-called green ghosts, as is typically the case in today's camera devices, the light sources that produce green ghost in digital images and videos may intentionally be captured with exposure settings that render images of such light sources more clearly, thereby providing algorithms that detect green ghosts in digital images with better information about the sources of light that would produce such green ghosts, as well as enabling development of novel algorithms that are not currently in use.

According to some embodiments, the techniques comprise: obtaining a first image captured by a first image capture device of an electronic device, wherein the first image is captured at a first exposure level; obtaining a second image captured by the first image capture device, wherein the second image is captured at a second exposure level, and wherein the second exposure level is underexposed relative to the first exposure level; detecting, in the second image, an estimated location of one or more light sources, wherein each of the one or more light sources meets a set of one or more light source criteria; for each of the one or more light sources detected in the second image: determining a candidate location in the first image of an unwanted reflection of the respective light source detected in the second image, wherein the candidate location is determined based, at least in part, on the estimated location of the respective light source detected in the second image; and repairing at least one unwanted reflection in the first image by modifying pixels in the first image at the determined candidate location of the respective at least one unwanted reflection.

In some such embodiments, determining a candidate location in the first image of an unwanted reflection of the respective light source detected in the second image further comprises: mirroring the estimated location of the respective light source detected in the second image across a principal point of a lens of the first image capture device.

In some such embodiments, the first exposure level comprises an EV0 exposure level and the second exposure level comprises an EV-exposure level. In some such embodiments, the second exposure level is in the range of EV-10 to EV-5.

In some such embodiments, the first image and the second image are captured concurrently on a first image sensor of the first image capture device by using interleaved exposure levels across the first image sensor.

In some such embodiments, the second image is captured in immediate succession after the first image.

In some such embodiments, determining a candidate location in the first image of an unwanted reflection of a respective light source detected in the second image further comprises: determining one or more characteristics of the respective light source detected in the second image; and identifying the one or more characteristics of the respective light source at the candidate location in the first image.

In some such embodiments, determining a candidate location in the first image of an unwanted reflection of a respective light source detected in the second image further comprises: evaluating an amount of contrast enhancement that has been applied to the candidate location in the first image.

In some such embodiments, repairing a first one of the at least one unwanted reflection in the first image comprises: modifying color values of one or more pixels in the first image at the determined candidate location of the first unwanted reflection.

In some such embodiments, repairing a first one of the at least one unwanted reflection in the first image comprises: using a trained neural network to determine modifications to color values of one or more pixels in the first image at the determined candidate location of the first unwanted reflection.

In some such embodiments, the techniques further comprise detecting a presence of light flicker in the second image. In some such embodiments, in response to detecting a presence of light flicker in the second image, the method further comprises: determining a candidate location in the first image of an unwanted reflection of a light source based, at least in part, on a saturation level of pixels in the first image.

In some such embodiments, in response to detecting a presence of light flicker in the second image, the method further comprises: obtaining a third image captured by the first image capture device, wherein at least a portion of the third image is captured at a third exposure level, and wherein the third exposure level is underexposed relative to the first exposure level and overexposed relative to the second exposure level; detecting, in the third image, an estimated location of one or more light sources, wherein each of the one or more light sources meets a set of one or more light source criteria; for each of the one or more light sources detected in the third image: determining a candidate location in the first image of an unwanted reflection of the respective light source detected in the third image, wherein the candidate location is determined based, at least in part, on the estimated location of the respective light source detected in the third image.

In some such embodiments, in response to detecting a presence of light flicker in the second image, the method further comprises: obtaining a third image captured by the first image capture device, wherein the third image is captured at the second exposure level, and wherein the first image capture device introduces a random amount of jitter into a timing of the capture of the third image; detecting, in the third image, an estimated location of one or more light sources, wherein each of the one or more light sources meets a set of one or more light source criteria; and for each of the one or more light sources detected in the third image: determining a candidate location in the first image of an unwanted reflection of the respective light source detected in the third image, wherein the candidate location is determined based, at least in part, on the estimated location of the respective light source detected in the third image.

In some such embodiments, detecting the presence of light flicker in the second image comprises at least one of the following: utilizing a flicker detector that is communicatively coupled to the first image capture device; performing a luminance analysis on the second image; performing a luminance analysis on the first image relative to the second image; or performing a luminance analysis on one or more images captured prior to the first image.

According to other embodiments, the techniques comprise: obtaining a first image captured by a first image capture device of an electronic device, wherein the first image is captured at a first exposure level and has a first field of view (FOV); obtaining a second image captured by a second image capture device, wherein the second image is captured at a second exposure level and has a second FOV, wherein the second exposure level is underexposed relative to the first exposure level, and wherein the second FOV contains the first FOV; detecting, in the second image, an estimated location of one or more light sources, wherein each of the one or more light sources meets a set of one or more light source criteria; for each of the one or more light sources detected in the second image: determining a candidate location in the first image of an unwanted reflection of the respective light source detected in the second image, wherein the candidate location is determined based, at least in part, on the estimated location of the respective light source detected in the second image; and repairing at least one unwanted reflection in the first image by modifying pixels in the first image at the determined candidate location of the respective at least one unwanted reflection.

In some such embodiments, the first image and the second image are captured at a same moment in time.

In some such embodiments, determining a candidate location in the first image of an unwanted reflection of the respective light source detected in the second image further comprises: mirroring the estimated location of the respective light source detected in the second image across a principal point of a lens of the second image capture device; and mapping the mirrored estimated location of the respective light source detected in the second image into the first FOV.

In some such embodiments, the first exposure level comprises an EV0 exposure level. In some such embodiments, the second exposure level comprises an EV-exposure level.

In some such embodiments, determining a candidate location in the first image of an unwanted reflection of a respective light source detected in the second image further comprises: determining one or more characteristics of the respective light source detected in the second image; and identifying the one or more characteristics of the respective light source at the candidate location in the first image.

In some such embodiments, determining a candidate location in the first image of an unwanted reflection of a respective light source detected in the second image further comprises: evaluating an amount of contrast enhancement that has been applied to the candidate location in the first image.

In some such embodiments, repairing a first one of the at least one unwanted reflection in the first image comprises:

modifying color values of one or more pixels in the first image at the determined candidate location of the first unwanted reflection.

In some such embodiments, repairing a first one of the at least one unwanted reflection in the first image comprises: using a trained neural network to determine modifications to color values of one or more pixels in the first image at the determined candidate location of the first unwanted reflection.

In some such embodiments, the techniques further comprise detecting a presence of light flicker in the second image. In some such embodiments, in response to detecting a presence of light flicker in the second image, the method further comprises: determining a candidate location in the first image of an unwanted reflection of a light source based, at least in part, on a saturation level of pixels in the first image. In some such embodiments, in response to detecting a presence of light flicker in the second image, the method further comprises: obtaining a third image captured by the second image capture device, wherein at least a portion of the third image is captured at a third exposure level, and wherein the third exposure level is underexposed relative to the first exposure level and overexposed relative to the second exposure level; detecting, in the third image, an estimated location of one or more light sources, wherein each of the one or more light sources meets a set of one or more light source criteria; and for each of the one or more light sources detected in the third image: determining a candidate location in the first image of an unwanted reflection of the respective light source detected in the third image, wherein the candidate location is determined based, at least in part, on the estimated location of the respective light source detected in the third image.

In some such embodiments, in response to detecting a presence of light flicker in the second image, the method further comprises: obtaining a third image captured by the second image capture device, wherein the third image is captured at the second exposure level, and wherein the second image capture device introduces a random amount of jitter into a timing of the capture of the third image; detecting, in the third image, an estimated location of one or more light sources, wherein each of the one or more light sources meets a set of one or more light source criteria; and for each of the one or more light sources detected in the third image: determining a candidate location in the first image of an unwanted reflection of the respective light source detected in the third image, wherein the candidate location is determined based, at least in part, on the estimated location of the respective light source detected in the third image.

In some such embodiments, detecting the presence of light flicker in the second image comprises at least one of the following: utilizing a flicker detector that is communicatively coupled to the second image capture device; performing a luminance analysis on the second image; performing a luminance analysis on the first image relative to the second image; or performing a luminance analysis on one or more images captured prior to the first image.

According to still other embodiments, the techniques comprise: obtaining a first image captured by a first image sensor of an electronic device; detecting an estimated location of one or more unwanted reflections of light sources in the first image; and repairing at least one unwanted reflection in the first image by modifying pixels in the first image at the estimated location of the respective unwanted reflection, wherein the detection and repairing are performed using a trained neural network or a machine learning (ML)- based approach, and wherein the repairing occurs before the first image is transmitted from the first image sensor to an image signal processor (ISP) of the electronic device for further processing.

According to yet embodiments, the techniques comprise: obtaining a first image captured by a first image capture device of an electronic device, wherein the first image capture device has a first dynamic range (DR), and wherein the first image is captured at a first exposure level; obtaining a second image captured by a second image capture device, wherein the second image capture device has a second DR that is greater than the first DR, wherein the second image is captured at a second exposure level; detecting, in the second image, an estimated location of one or more light sources, wherein each of the one or more light sources meets a set of one or more light source criteria; for each of the one or more light sources detected in the second image: determining a candidate location in the first image of an unwanted reflection of the respective light source detected in the second image, wherein the candidate location is determined based, at least in part, on the estimated location of the respective light source detected in the second image; and repairing at least one unwanted reflection in the first image by modifying pixels in the first image at the determined candidate location of the respective at least one unwanted reflection.

In some such embodiments, a resolution of the first image is greater than a resolution of the second image. In some such embodiments, a bit depth of the second image is greater than a bit depth of the first image.

In some such embodiments, the second image capture device comprises: an image sensor with a lateral overflow integration capacitor (LOFIC) architecture; a single-photon avalanche diode (SPAD) sensor; or a passive free-running SPAD (PF-SPAD).

According to yet other embodiments, the techniques comprise: obtaining a first image captured by a first image capture device of an electronic device, wherein the first image is captured at a first exposure level and with a first dynamic range (DR); modifying pixel data of the first image to generate a second image, wherein the pixel data of the first image is modified to simulate a version of the first image that had been captured at a second exposure level, wherein the second exposure level is underexposed relative to the first exposure level; detecting, in the second image, an estimated location of one or more light sources, wherein each of the one or more light sources meets a set of one or more light source criteria; for each of the one or more light sources detected in the second image: determining a candidate location in the first image of an unwanted reflection of the respective light source detected in the second image, wherein the candidate location is determined based, at least in part, on the estimated location of the respective light source detected in the second image; and repairing at least one unwanted reflection in the first image by modifying pixels in the first image at the determined candidate location of the respective at least one unwanted reflection.

In some such embodiments, the first image capture device comprises: an image sensor with a lateral overflow integration capacitor (LOFIC) architecture; a single-photon avalanche diode (SPAD) sensor; or a passive free-running SPAD (PF-SPAD).

In some such embodiments, the techniques further comprise clipping the pixel data of the first image at a first predetermined level prior to determining the candidate locations in the first image of the unwanted reflections of each of the one or more light sources detected in the second image.

Various non-transitory computer readable media embodiments are disclosed herein. Such computer readable media are readable by one or more processors. Instructions may be stored on the computer readable media for causing the one or more processors to perform any of the techniques disclosed herein.

Various programmable electronic devices are also disclosed herein, in accordance with the program storage device embodiments enumerated above. Such electronic devices may include one or more image capture devices, such as optical image sensors/camera units; a display; a user interface; one or more processors; and a memory coupled to the one or more processors. Instructions may be stored in the memory, the instructions causing the one or more processors to execute instructions in accordance with the various techniques disclosed herein.

BRIEF DESCRIPTION OF THE DRAWINGS

FIG. 6A is a flow chart illustrating an exemplary method of performing unwanted reflection artifact mitigation in video image streams captured by a single camera, according to one or more embodiments.

FIG. 6B is a flow chart illustrating an exemplary method of performing unwanted reflection artifact mitigation using video image streams captured by two cameras, according to one or more embodiments.

FIG. 6C is a flow chart illustrating an exemplary method of performing unwanted reflection artifact mitigation using a machine learning-based approach, according to one or more embodiments.

FIG. 6D is a flow chart illustrating an exemplary method of performing unwanted reflection artifact mitigation using a video image stream captured by a standard dynamic range (SDR) camera and a video image stream captured by a high dynamic range (HDR) camera, according to one or more embodiments.

DETAILED DESCRIPTION

In the following description, for purposes of explanation, numerous specific details are set forth in order to provide a thorough understanding of the inventions disclosed herein. It will be apparent, however, to one skilled in the art that the inventions may be practiced without these specific details. In other instances, structure and devices are shown in block diagram form in order to avoid obscuring the inventions. References to numbers without subscripts or suffixes are understood to reference all instance of subscripts and suffixes corresponding to the referenced number. Moreover, the language used in this disclosure has been principally selected for readability and instructional purposes and may not have been selected to delineate or circumscribe the inventive subject matter, and, thus, resort to the claims may be necessary to determine such inventive subject matter. Reference in the specification to "one embodiment" or to "an embodiment" (or similar) means that a particular feature, structure, or characteristic described in connection with the embodiments is included in at least one embodiment of one of the inventions, and multiple references to "one embodiment" or "an embodiment" should not be understood as necessarily all referring to the same embodiment.

Introduction and Problem Background

As described above, due to the interplay of various optical elements in a camera, various bright light sources, including the Sun, can cause "ghosting" image artifacts in captured images, which can deteriorate image quality and/or obscure other elements in a captured scene. In the case of captured video image sequences (i.e., as opposed to still image capture), even more challenges are present, such as enforcing a temporal consistency of any artifact repair/mitigation operations applied to the images over the duration of the image sequence, operating within an allotted power, thermal, and/or processing time budget an integrated device, etc. Thus, presented herein are efficient techniques to detect, track, and mitigate unwanted reflection artifacts, such as so-called "green ghosts" in captured video image sequences. In some cases, the processing techniques described herein may intentionally be captured with exposure settings that render images of such green ghost-causing light sources more clearly, thereby providing algorithms that detect green ghosts in digital images with better information about the sources of light that would produce such green ghosts, as well as enabling development of novel algorithms that are not currently in use.

Figure 1:
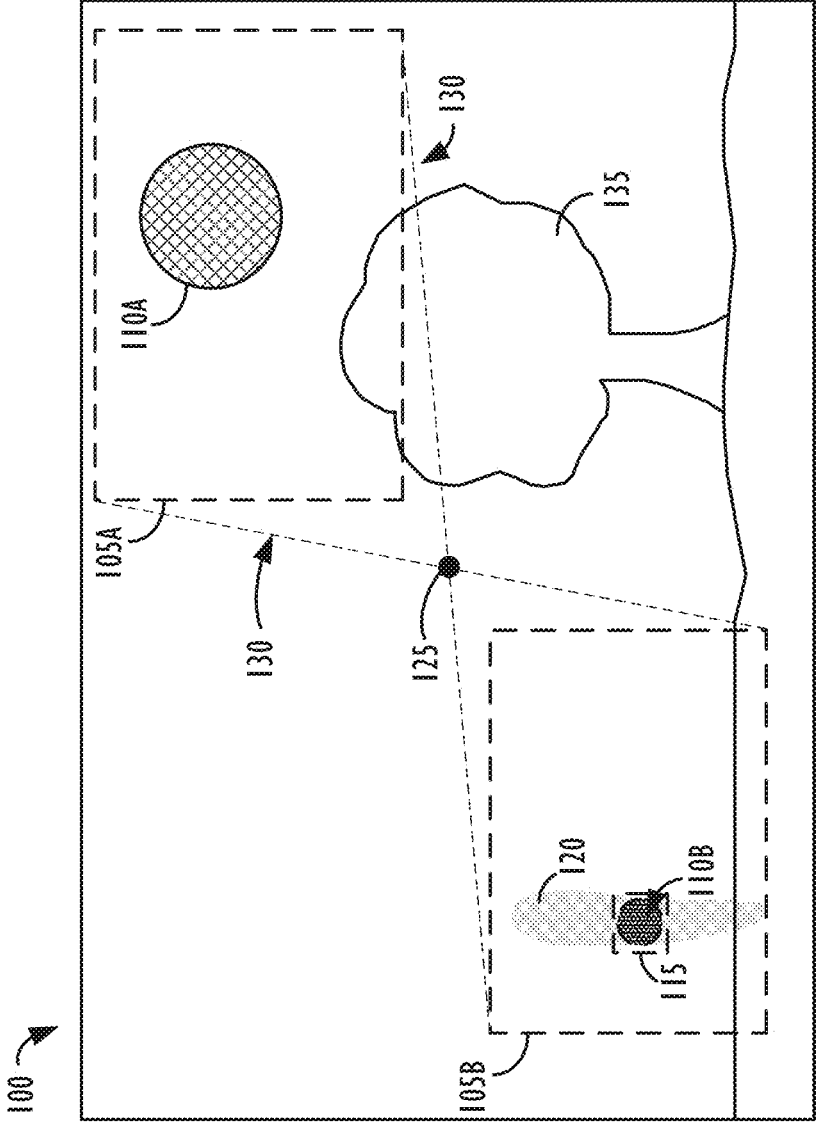
FIG. 1 illustrates an exemplary video image captured of an exemplary scene exhibiting unwanted reflection artifacts, according to one or more embodiments.

Turning now to FIG. 1, an exemplary video image 100 captured of an exemplary scene including the Sun 110A and a tree 135 and exhibiting unwanted reflection artifacts is illustrated, according to one or more embodiments. In image 100, there is a bright light source, in this case, the Sun 110A. By applying various heuristics and/or image metadata, e.g., based on image pixel brightness levels, shape, estimated scene depth, etc., a region 105A of the image may be estimated and extracted as containing a bright light source in the captured scene. Next, based on one or more other heuristics and/or image metadata, e.g., based on a zoom level of the camera, a focus level of the camera, an adjusted principal point of the camera's lens, etc., a size and location of a region 105B of the image may be estimated and extracted as comprising a search space for an unwanted reflection artifact of the bright light source in the captured scene.

A simple lens may be defined as having two spherical surfaces, wherein each of these spherical surfaces has its own spherical center. The line that goes through these two spherical centers is referred to herein as the "principal axis" of the lens. A complex lens system also has an equivalent principal axis. The point where the principal axis intersects the image plane is defined as the "principal point." The principal point may or may not be perpendicular to the image plane/image sensor, depending on the characteristics of the lens system. In some embodiments, the location of region 105B of the image may be determined, at least in part, by "mirroring" the estimated location of the light source region 105A across a principal point (125) of a lens of the image capture device of the electronic device (e.g., with the bounds of region 105B represented by mirroring lines 130 in FIG. 1). According to some such embodiments, the "mirrored" point of a hypothetical point "A" across the "principal point" may be defined as: the point that falls on the straight line connecting point "A" and the principal point, but on the opposite side of the principal point (i.e. as compared to the side where point "A" is located) and which also maintains the same distance from the principal point as point "A".

Within region 105B of the image, an image tile 115 may be searched for and determined that represents a sub-region of pixels within the region 105B where the unwanted reflection artifact is most likely to be located. According to some embodiments, within image tile 115, a most likely location 110B of the unwanted reflection artifact may also be determined, e.g., based, at least in part, on the brightness of the pixels, the color or shape pattern of the brightest pixels in the region, a motion signature of the brightest pixels over several captured image frames, etc. As will be described herein, by modifying the exposure settings (or effective exposure settings) of a captured image, e.g., either directly via the image sensor or through image post-processing techniques, green ghost detection may be facilitated. For example, capturing images with an extremely high dynamic range and/or an extremely short exposure time may facilitate the discovery of additional information regarding the presence and/or characteristics of green ghosts in captured images that would not otherwise be discernible, e.g., in typical EV0 and/or images with a more standard dynamic range.

In some captured scenes, there may also be additional so-called "lens flare" (120) artifacts in the captured image. In some such cases, the lens flare may be adjacent to or surrounding the unwanted reflection artifact 110B. Correction and/or mitigation of unwanted lens flare artifacts is outside the scope of this disclosure, as it is caused by a different phenomenon and has different characteristics, causing the need for different repair and mitigation strategies than may be employed on ghosting artifacts such as those described herein.

As may be understood, for integrated electronic devices with multiple image capture devices, the size and/or location of the search space region 105B for the unwanted reflection artifact may be modified as needed, e.g., depending on the particular optical properties and/or metadata of the particular image capture device used to capture the image. In some cases, electronic device metadata, including time of day, time of year, GPS position of the electronic on Earth, etc., may also be leveraged to estimate an expected position of the Sun and/or an expected overall color cast of the captured image (especially for images where the Sun is likely to be the bright light source that is causing the unwanted reflection artifacts), which may have an effect on the expected color of the pixels making up the unwanted reflection artifact (e.g., making them more likely to be whitish or yellowish in tint, rather than greenish).

Figure 2A:
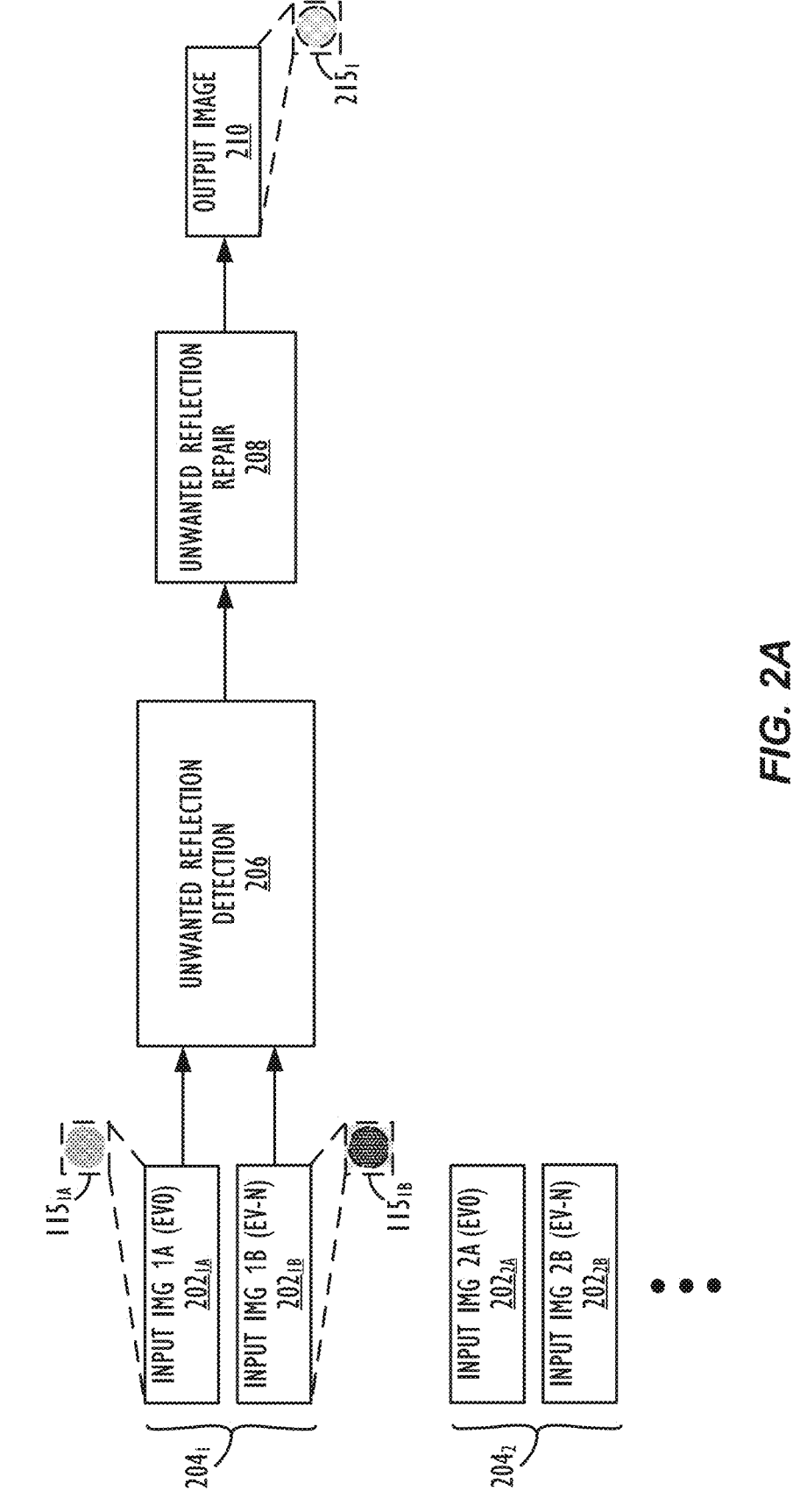
FIG. 2A is an image processing pipeline illustrating an exemplary method of performing unwanted reflection artifact mitigation in video image streams comprising pairs of images captured at different exposure levels, according to one or more embodiments.

Exemplary Unwanted Reflection Artifact Detection and Mitigation Image Processing Pipelines Turning now to FIG. 2A, an image processing pipeline 200 illustrating an exemplary method of performing unwanted reflection artifact mitigation in video image streams comprising pairs of images captured at different exposure levels is shown, according to one or more embodiments. First, a pair $204_1$ of input images $202_{1A}/202_{1B}$ may be obtained. According to some embodiments, image $202_{1A}$ may comprise an image captured at a default or EV0 exposure setting (e.g., an exposure setting as determined by an image capture device's auto exposure (AE) system), while image $202_{1B}$ may comprise an image captured at a relatively underexposed (i.e., relative to EV0) exposure setting. For example, the image $202_{1B}$ may comprise an image captured using an EV-2 exposure setting, or, in other examples, may comprise an image using a more extreme underexposure setting, e.g., EV-5, EV-8, or EV-10, etc., wherein the degree of underexposure may be determined by the needs of a given implementation and/or an analysis of the particular scene being captured. As described above, one or more of the input images $202_{1A}/202_{1B}$ may comprise one or more regions containing unwanted reflection artifacts (e.g., exemplary image tile representation $115_{1A}$ from image $202_{1A}$ and exemplary image tile representation $115_{1B}$ from image $202_{1B}$) that it may be desired to repair or mitigate.

As will be explained in further detail below, in some cases, the more underexposed input image from an input image pair, e.g., $202_{1B}$ in image pair $204_1$ of FIG. 2A, may provide a better source image for prescreening out potential "false positive" unwanted reflection artifacts in the captured scene, e.g., only extremely bright reflections, such as is shown in exemplary image tile representation $115_{1B}$ from image $202_{1B}$ may still be strongly visible in extremely underexposed (e.g., EV-N) images, such as image $202_{1B}$. Next, the desired portion(s) from the desired image(s) 202 from a given input image pair 204 may be sent to the unwanted reflection detection portion 206 of the image processing pipeline 200. The unwanted reflection detection portion 206 may be used to identify and/or track unwanted reflection artifacts in the captured scene.

Next, at block 208, an image repair or mitigation operation may be performed to mitigate the appearance of the unwanted reflection artifact from the input image $202_{1A}$ and generate a repaired output image 210, which may be saved to storage. Any desired image repair or mitigation operation may be applied for a given implementation (e.g., ML model-based mitigation methods, image heuristic-based mitigation methods, etc.). As shown in FIG. 2, repaired image tile $215_1$ illustrates an exemplary result of the unwanted reflection artifact repair operation. For example, the repaired image tile pixel values in image tile $215_1$ have lighter gray pixels than the pixels in the unrepaired image tile $115_{1A}$, indicating that the appearance of the unwanted reflection artifact has been mitigated to an extent, but not so strongly that it would be likely to result in unwanted (and potentially visually jarring) flickering in the repaired region of the images over the duration of a repaired video image sequence.

As may be understood, in the case of an incoming video image sequence, the detection and repair processes described above may continue to be carried out for subsequently-captured input image pairs, e.g., a second pair $204_2$ of input images $202_{2A}/202_{2B}$, wherein, again, image $202_{2A}$ comprises an image captured at a default or EV0 exposure setting, while image $202_{2B}$ comprises an image captured at a relatively underexposed (i.e., EV-N) exposure setting that may aid in the identification unwanted reflection artifacts in the captured scene.

Figure 2B:
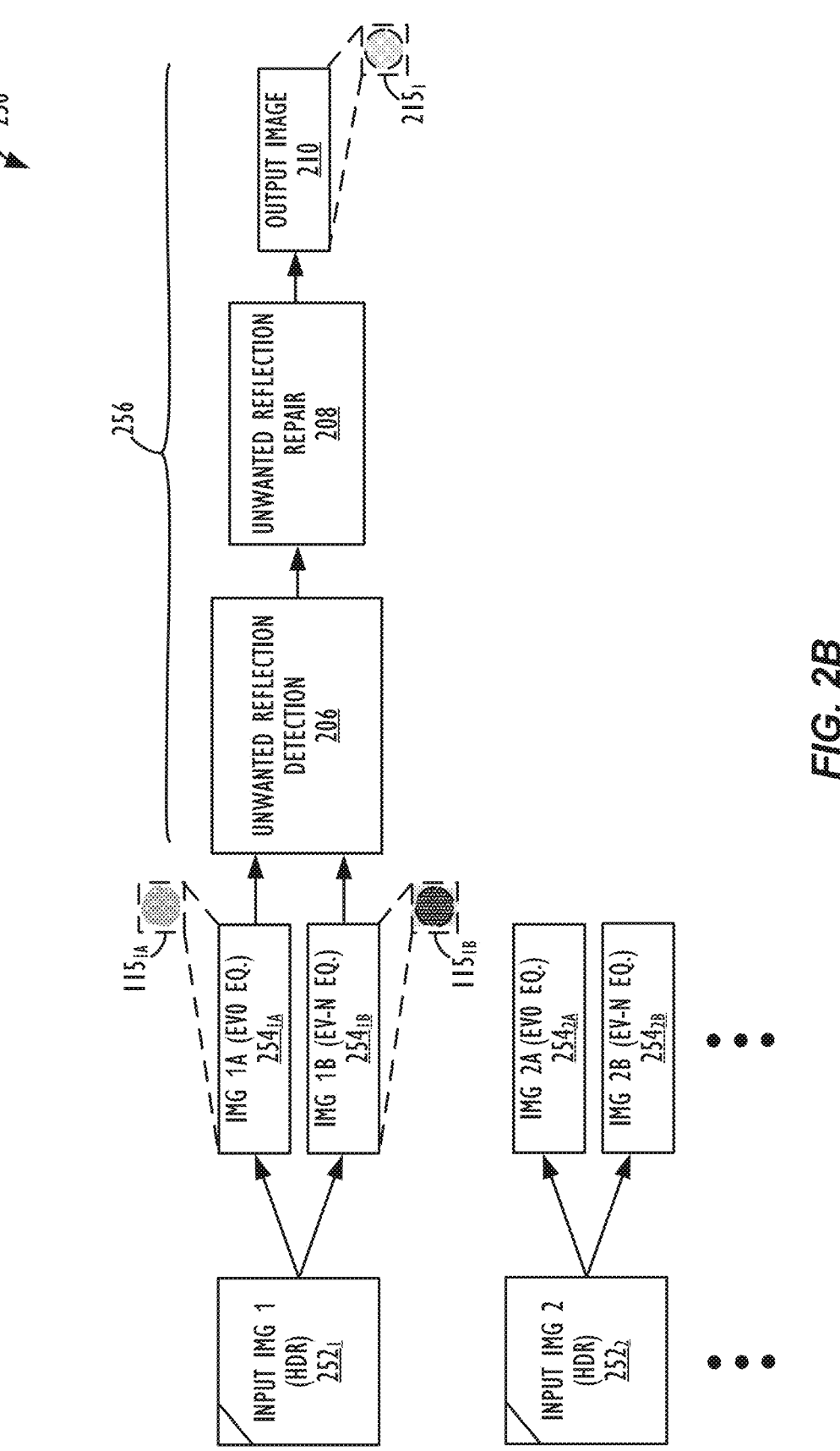
FIG. 2B is an image processing pipeline illustrating an exemplary method of performing unwanted reflection artifact mitigation in video image streams comprising high dynamic range (HDR) images that are modified to simulate an underexposed version of the captured image, according to one or more embodiments.

Turning now to FIG. 2B, an image processing pipeline 250 illustrating an exemplary method of performing unwanted reflection artifact mitigation in video image streams comprising high dynamic range (HDR) images that are modified to simulate an underexposed version of the captured image is shown, according to one or more embodiments.

As compared to FIG. 2A, the video image sequence in exemplary image processing pipeline 250 comprises singe images (e.g., $252_1$, $252_2$, etc.), e.g., high dynamic range (HDR) images (e.g., a 20-bit depth) rather than pairs of images each having a more standard dynamic range (e.g., an 8-bit depth). In the embodiment of FIG. 2B, pixel data of the input images 252 may be modified to generate a first image (e.g., an EV0-equivalent image, $254_{1A}$) and a second image (e.g., an EV-N-equivalent image, $254_{1B}$), wherein the pixel data of the first image is modified to simulate a version of the first image that had been captured at a second exposure level, and wherein the second exposure level is underexposed relative to the first exposure level. After the manipulation of the pixel data of the input image 252 to generate the EV0-equivalent image and EV-N-equivalent image, the remainder of image processing pipeline 250 (shown by bracket 256) may be similar to that of image processing pipeline 200 of FIG. 2A, i.e., involving unwanted reflection detection and mitigation modules.

As described above with reference to FIG. 2A, in the case of an incoming video image sequence, the detection and repair processes described with reference to FIG. 2B may continue to be carried out for subsequently-captured input images, e.g., a second HDR image $252_2$ modified to produce a second EV0-equivalent image, $254_{2A}$, and a second EV-N-equivalent image, 2542B.

Figure 3:
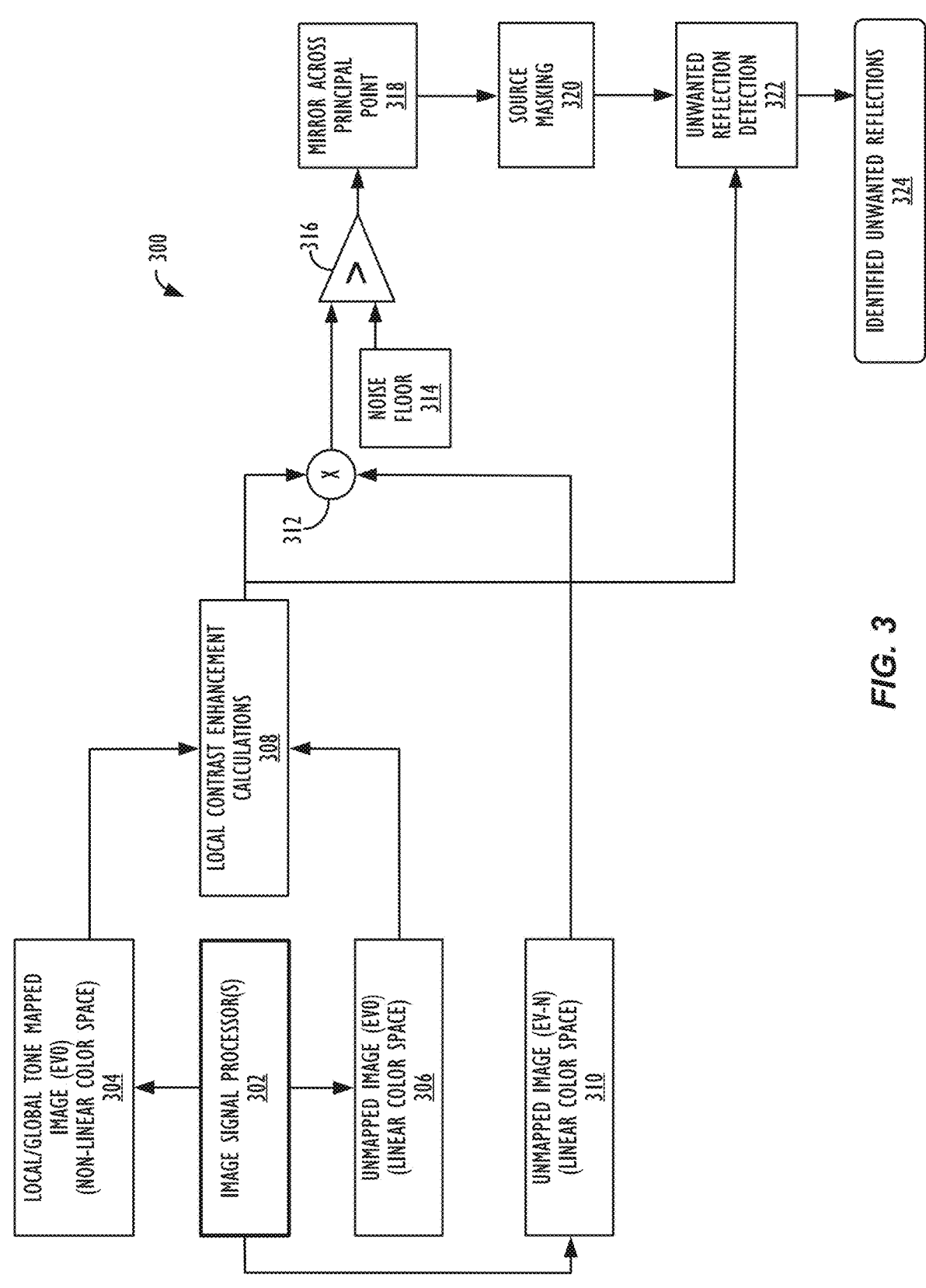
FIG. 3 is an image processing pipeline illustrating an exemplary method of performing unwanted reflection artifact detection in video image streams, according to one or more embodiments.

FIG. 3 is an image processing pipeline 300 illustrating an exemplary method of performing unwanted reflection artifact detection in video image streams, according to one or more embodiments. Exemplary image processing pipeline 300 may involve the use of one or more image signal processors (ISPs) 302. ISP 302 may be configured to produce: unmapped (i.e., linear) EV0 images (e.g., 306), unmapped (i.e., linear) EV-N images (e.g., 310), and local/global tone mapped (i.e., non-linear) EV0 images (e.g., 304).

In some such embodiments, local contrast enhancement calculations may be performed on images 304 and 306 at a local contrast enhancement module 308. For example, in areas of a captured image where the contrast was reduced between the RAW (i.e., unmapped) version of the image and the final (i.e., tone mapped) version of the image, it may be more difficult to detect unwanted deflection artifact as well, due to the contrast in the artifact being reduced by the same factor. Thus, this contrast enhancement (e.g., as performed by an ISP) could be compensated for by local contrast enhancement module 308 to increase the chances of successfully detecting the unwanted reflection artifacts.

At block 312, the (optionally contrast-enhanced) unmapped EV0 image 306 may be multiplied with the unmapped EV-N image 310 to attempt to determine the location of bright light sources in the captured scene (e.g., as manifested in input image 306 and/or unmapped image 304). In some embodiments, a noise floor 314 may also be applied at block 316, i.e., to attempt to rule out pixels that do not have values greater than the noise floor 314 from being identified as potential light sources that may be causing unwanted reflection artifacts.

At block 318, the identified locations of light sources that may be causing unwanted reflection artifacts may be mirrored across a principal point of the capturing camera's lens. At block 320, a source mask may be applied to the input image 306, i.e., to attempt to mask out all regions of the input image 306 wherein analysis of the EV-N input image 310 was not indicative of the presence of a potential unwanted reflection artifact. Finally, at block 322, a desired unwanted reflection (e.g., green ghost) detection algorithm(s) may be applied to the non-masked regions of the contrast-enhanced version of the EV0 input image produced at block 308, resulting in the identification of one or more location of unwanted reflections at block 324.

Figure 4:
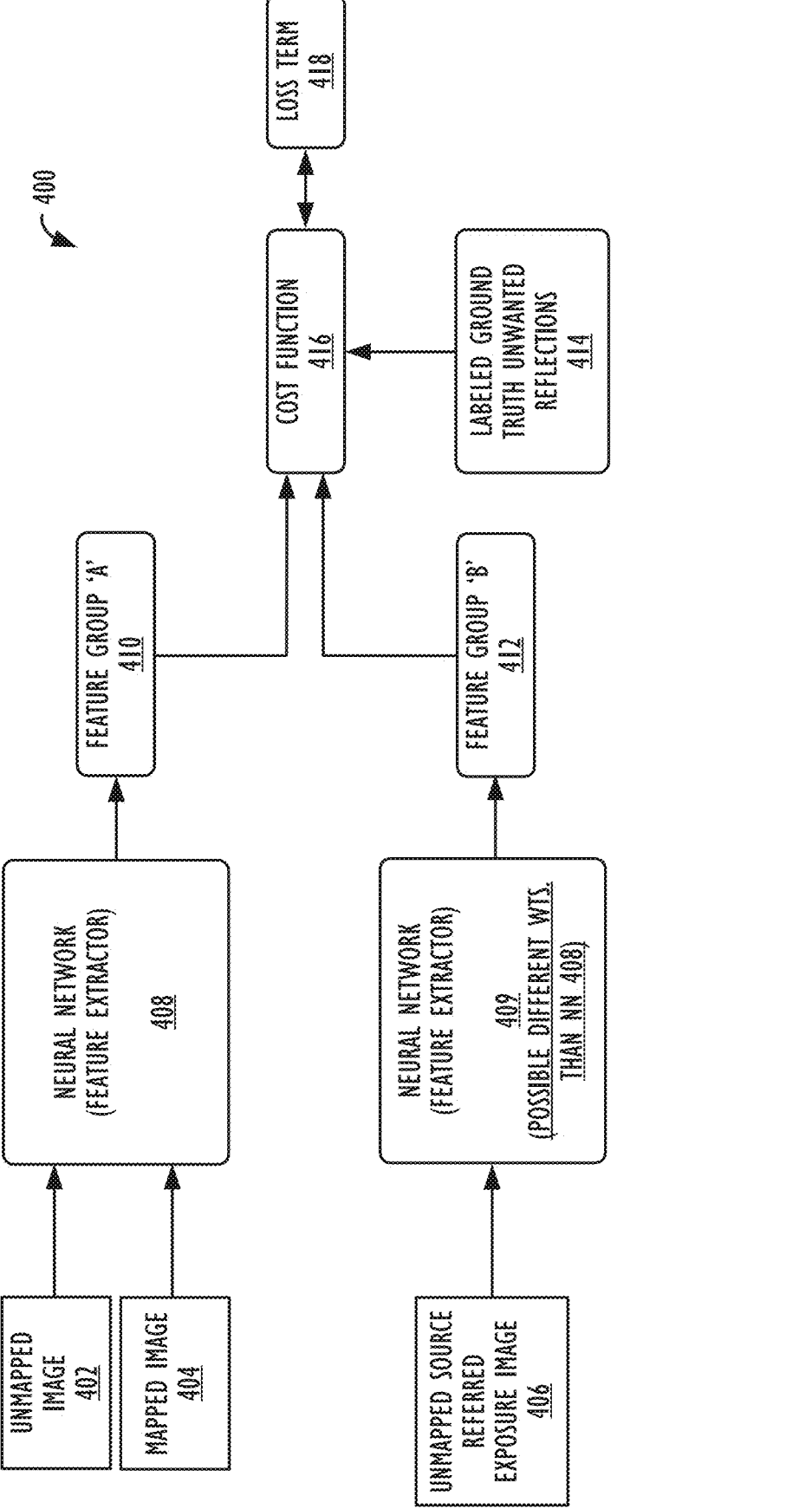
FIG. 4 is an image processing pipeline illustrating an exemplary method of training a neural network to perform unwanted reflection artifact detection in video image streams, according to one or more embodiments.

FIG. 4 is an image processing pipeline 400 illustrating an exemplary method of training a neural network to perform unwanted reflection artifact detection in video image streams, according to one or more embodiments. The image processing pipeline 400 may begin with one or more versions of an input training image, e.g., an unmapped version 402 (e.g., in linear color space), a mapped version 404 (e.g., a locally and/or globally tone mapped version of the image in non-linear color space), and/or an unmapped source-referred version of the image 406.

In some embodiments, unmapped image 402 and mapped image 404 may be fed into a neural network 408 (e.g., a Unet) to attempt to extract a first feature group 'A' (410) representing suspected unwanted reflection artifacts (e.g., green ghosts), while the unmapped source-referred version of the image 406 may be fed into a neural network 409 (which may, e.g., be a similar Unet to neural network 408, but perhaps with different weights) to attempt to extract a second feature group 'B' (412) representing suspected unwanted reflection artifacts. Next, a cost function 416 (e.g., a Dice loss function) may be applied to a ground truth 414 of labeled unwanted reflection artifacts in the input image to compute a loss term 418. By attempting to minimize loss term 418 over the training of neural network 408/409, the neural network may learn how to detect specific unwanted reflection artifacts in input images.

Figure 5:
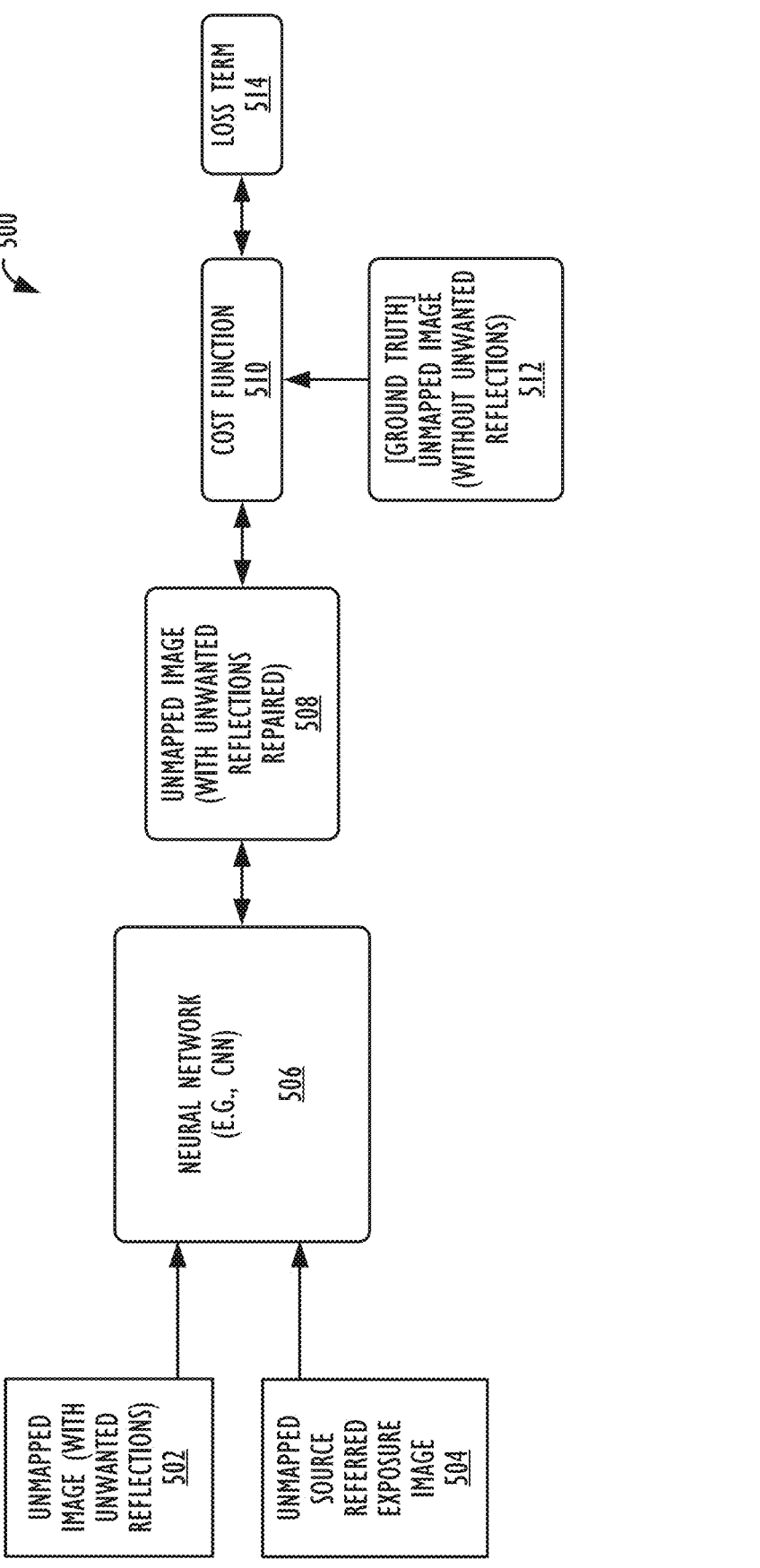
FIG. 5 is an image processing pipeline illustrating an exemplary method of training a neural network to perform pre-image signal processor (ISP) unwanted reflection artifact detection in video image streams, according to one or more embodiments.

FIG. 5 is an image processing pipeline 500 illustrating an exemplary method of training a neural network to perform pre-image signal processor (ISP) unwanted reflection artifact detection in video image streams, according to one or more embodiments. The image processing pipeline 500 may begin with one or more versions of an input training image, e.g., an unmapped version 502 (e.g., with unwanted reflection artifacts in it) and an unmapped source-referred version of the image 504.

In some embodiments, unmapped image 502 and unmapped source-referred version of the image 504 may be fed into a neural network 506 (e.g., a Convolutional Neural Network (CNN)) to attempt to directly produce an unmapped version of the image with the unwanted reflection artifacts repaired 508.

A cost function 510 (e.g., a Perceptual Signal to Noise Ratio (PSNR) function) may be applied to a ground truth 512 version of the image without any unwanted reflection artifacts to compute a loss term 514. By attempting to minimize loss term 514 over the training of neural network 506, the neural network may learn how to remove unwanted reflection artifacts in input images-even prior to tone mapping or other ISP operations.

Exemplary Image Processing Operations for Unwanted Reflection Artifact Mitigation in Video Image Streams FIG. 6A is a flow chart illustrating an exemplary method 600 of performing unwanted reflection artifact mitigation in video image streams captured by a single camera, according to one or more embodiments. First, at step 602, the method 600 may obtain a first image captured by a first image capture device of an electronic device, wherein the first image is captured at a first exposure level (e.g., an EV0 exposure level).

Next, at step 604, the method 600 may obtain a second image captured by the first image capture device, wherein the second image is captured at a second exposure level, and wherein the second exposure level is underexposed relative to the first exposure level (e.g., an EV-N exposure level). In some embodiments, a value of EV-2 may be used for the second exposure level. In other embodiments, a more extreme value may be used for the second exposure level, e.g., a second exposure level in the range of EV-10 to EV-5.

In some embodiments, the second image is captured in immediate succession after the first image, e.g., within a few milliseconds. In other embodiments, the capture of the second image may be more temporally distinct from the first image. However, ideally, there should be close correspondence between the scenes captured in the first image and the second image, such that estimated locations of light sources in the second image have a reliable correspondence to candidate locations in the first image where the actual unwanted reflection artifact may be located in the image that a user actually wishes to store to long term memory (i.e., the second image or "EV-N" image is likely to be too dark to actually be saved by a user, and is instead used only to aid in the identification of likely unwanted reflection artifacts in the first image).

In still other embodiments, the first image and the second image may be captured concurrently, e.g., on an image sensor using interleaved exposure levels across the image sensor (e.g., by tile, by rows, by individual pixels, etc.).

Next, at step 606, the method 600 may detect, in the second image, an estimated location of one or more light sources, wherein each of the one or more light sources meets a set of one or more light source criteria. For example, the light source criteria may comprise a requirement that pixels in a candidate light source have greater than a threshold average illuminance level, have greater than a particular minimum threshold size, have an acceptable color and/or shape, etc.

Next, at step 608, the method 600 may, for each of the one or more light sources detected in the second image, perform the following operation at step 610: determine a candidate location in the first image of an unwanted reflection of the respective light source detected in the second image, wherein the candidate location is determined based, at least in part, on the estimated location of the respective light source detected in the second image (and, optionally, on one or more characteristics of the respective light source). For example, according to some embodiments, determining the candidate location for an unwanted reflection may comprise mirroring of "flipping" the estimated location of the respective light source detected in the second image across a principal point of a lens of the first image capture device and, e.g., determining a "search space" box (or other polygon) based around the determined candidate location, in which an unwanted reflection artifact detection algorithm may search for green ghosts or other unwanted reflections.

In other embodiments, determining a candidate location in the first image of an unwanted reflection of a respective light source detected in the second image at step 610 may further comprise: determining one or more characteristics of the respective light source detected in the second image and then attempting to identify the one or more characteristics of the respective light source at the candidate location in the first image. In other words, if a detected light source from the second image has a particular size, shape, outline, etc., an algorithm may attempt to search for an unwanted reflection artifact in the first image that has those same particular size, shape, outline, etc. characteristics. In some cases, the search space when looking for an unwanted reflection may be tightened (i.e., reduced in size) based on the shape/size of the detected light source, e.g., by performing key point detection on the artifact in the second image and then identifying similar key points in the first image candidate locations (e.g., using pixel-accurate cross-correlations, SIFT, neural networks, etc.).

In still other embodiments, ML-based models may be employed at step 610 to analyze the characteristics of a light source and then predict if/where the corresponding unwanted reflection artifact (e.g., a green ghost) is located in the first image.

In yet other embodiments, determining the candidate location in the first image of an unwanted reflection of a respective light source detected in the second image at step 610 further comprises evaluating an amount of contrast enhancement that has been applied to the candidate location in the first image. For example, in areas of the first image where contrast may have been reduced by a factor of 4× between the RAW image and final mapped image, it will be harder to identify green ghost artifacts, because their contrast would also be reduced by a factor of 4×, so this contrast adjustment could be taken account of in any green ghost detection operations performed on the image. Conversely, in areas of the first image where contrast may have been increased by a factor of 4× between the RAW image and final mapped image, it will be easier to identify green ghost artifacts, because their contrast would also be increased by a factor of 4×, so this contrast adjustment could also be taken account of in any green ghost detection operations performed on the image.

Finally, at step 612, the method 600 may repair at least one unwanted reflection in the first image by modifying pixels in the first image at the determined candidate location of the respective at least one unwanted reflection (e.g., modifying the pixels values in the image at the location of the unwanted reflection using image-based heuristics or by using a trained artifact repair neural network, etc.).

In some environments, a scene may be lit by an artificial light source (e.g., an LED light) that flickers with a certain frequency (e.g., 100-120 kHz) and/or duty cycle. In such cases, the method may further comprise detecting a presence of light flicker occurring before (and/or contemporaneously with) the capture of the second image (e.g., using a flicker sensor, ambient light sensor, etc.). Due to the potentially extremely short exposure times of the second image (e.g., EV-N image), it is possible that the second image may be completely dark (i.e., capturing during an off period of the flickering light source).

According to some embodiments, detecting the presence of light flicker in an image comprises performing at least one of the following actions: utilizing a flicker detector that is communicatively coupled to the first image capture device; performing a luminance analysis on the second image (e.g., to see how drastically and/or how rapidly the light levels in the scene are changing); performing a luminance analysis on the first image relative to the second image (e.g., if one image has normal luminance level and the other image is completely dark); or performing a luminance analysis on one or more images captured prior to the first image (e.g., analyzing a few images prior to the first image and find large deviations in average luminance could also be indicative of the presence of light source flicker).

In some cases of light flicker being present, according to some embodiments, when flicker is detected, the green ghost detection algorithm may look for additional clues to locate potential green ghost artifacts, e.g., just looking for saturated regions in the first image (i.e., rather than using the second image to provide clues as to the location of green ghost artifacts in the first image).

In other embodiments wherein light source flicker has been detected, the image capture device may first attempt to increase the exposure time of the image capture device (e.g., from EV-8 to EV-5), i.e., to attempt to move the underexposed image out of a flicker "trough" situation where a pure dark image is captured. However, this approach may also generate additional false positive green ghost candidate in the first image and/or give less precision on location, but such tradeoffs may be acceptable, in order to avoid the flicker situation.

In some such embodiments, an additional image (i.e., a third image) may be captured, wherein at least a portion of the third image is captured at a third exposure level, and wherein the third exposure level is underexposed relative to the first exposure level and overexposed relative to the second exposure level. For example, according to some embodiments, the entire image may be captured at third exposure level (e.g., EV-5). In other embodiments, an image sensor may be able to use multiple different exposure values on a per-pixel or per-tile basis, such that only certain sub-portion(s) of the third image are captured at the third exposure level. In still other embodiments, the image sensor may introduce a random amount of jitter into a timing of the capture of the third image, e.g., moving the capture up or back by a few milliseconds (again, to attempt to move the underexposed image out of a flicker "trough" situation where a pure dark image is captured). In some embodiments, a ring buffer of image frames captured at the two exposure levels may be used (i.e., instead of just one image frame form each exposure level).

FIG. 6B is a flow chart illustrating an exemplary method 640 of performing unwanted reflection artifact mitigation using video image streams captured by two cameras, according to one or more embodiments. First, at step 642, the method 640 may obtain a first image captured by a first image capture device of an electronic device, wherein the first image is captured at a first exposure level (e.g., an EV0 exposure level) and has a first field of view (FOV).

Next, at step 644, the method 640 may obtain a second image captured by a second image capture device, wherein the second image is captured at a second exposure level (e.g., an EV-N exposure level) and has a second FOV, wherein the second exposure level is underexposed relative to the first exposure level, and wherein the second FOV contains the first FOV. In other embodiments, the second FOV may at least partially overlap with the first FOV in angular space (e.g., if it does not contain it in its entirety).

Next, at step 646, the method 640 may detect, in the second image, an estimated location of one or more light sources, wherein each of the one or more light sources meets a set of one or more light source criteria. Various possible light source criteria have been described above, e.g., with reference to step 606.

Next, at step 648, the method 640 may, for each of the one or more light sources detected in the second image, perform the following operation at step 650: determine a candidate location in the first image of an unwanted reflection of the respective light source detected in the second image, wherein the candidate location is determined based, at least in part, on the estimated location of the respective light source detected in the second image (and, optionally, on one or more characteristics of the respective light source). Various possible ways of determining the possible locations of unwanted reflection artifacts in the first image have been described above, e.g., with reference to step 610.

In some dual-image capture device embodiments (such as described in FIG. 6B), determining a candidate location in the first image of an unwanted reflection of the respective light source detected in the second image further comprises: mirroring the estimated location of the respective light source detected in the second image across a principal point of a lens of the second image capture device; and mapping the mirrored estimated location of the respective light source detected in the second image into the first FOV. (It may also be necessary, in some dual-image capture device embodiments, to compensate for parallax correction, depending on the physical arrangement of the two image capture devices with respect to one another.)

Finally, at step 652, the method 640 may repair at least one unwanted reflection in the first image by modifying pixels in the first image at the determined candidate location of the respective at least one unwanted reflection (e.g., modifying the pixels values in the image at the location of the unwanted reflection using image-based heuristics or by using a trained artifact repair neural network, etc.).

FIG. 6C is a flow chart illustrating an exemplary method 660 of performing unwanted reflection artifact mitigation using a machine learning-based approach, according to one or more embodiments. First, at step 662, the method 660 may obtain a first image captured by a first image sensor of an electronic device. Next, at step 664, the method 660 may detect an estimated location of one or more unwanted reflections of light sources in the first image.

Next, at step 666, the method 660 may, repair at least one unwanted reflection in the first image by modifying pixels in the first image at the estimated location of the respective unwanted reflection. In some embodiments, the repair may involve: performing the detection and repairing using a trained neural network or a machine learning (ML)-based approach (step 668). In some embodiments, the repair may occur before the first image is transmitted from the first image sensor to an image signal processor (ISP) of the electronic device for further processing (step 669). In other words, according to the method 660 of FIG. 6C, the trained neural network has learned how to recover an unwanted reflection artifact-free Bayer image frame-prior to sending the image frame to the ISP. Because linear processes are invertible, ML-based models have proven, in some cases, to be good at mimicking the inversion of the linear process without needing an exact calibrated model, although large training data sets may be required.

FIG. 6D is a flow chart illustrating an exemplary method 670 of performing unwanted reflection artifact mitigation using a video image stream captured by a standard dynamic range (SDR) camera and a video image stream captured by a high dynamic range (HDR) camera, according to one or more embodiments. First, at step 672, the method 670 may obtain a first image captured by a first image capture device of an electronic device, wherein the first image capture device has a first dynamic range (DR), and wherein the first image is captured at a first exposure level. For example, as described above the first image capture device in the example of method 670 may be an SDR camera (e.g., 8-bit depth).

Next, at step 674, the method 670 may obtain a second image captured by a second image capture device, wherein the second image capture device has a second DR that is greater than the first DR, wherein the second image is captured at a second exposure level. For example, as described above the second image capture device in the example of method 670 may be an HDR camera (e.g., greater than 8-bit depth), such as a camera using a lateral overflow integration capacitor (LOFIC) complementary metal oxide semiconductor (CMOS) image sensor, a single-photon avalanche diode (SPAD) sensor, or a passive free-running SPAD (PF-SPAD) sensor. One advantage of using an LOFIC image sensor may be that it has the same exposure duration as a typical EV0 image, and it will have the same amount of motion blurring in both light source and the reflection artifacts that they cause. The more that light sources and their corresponding reflection artifacts look the same, the better chance an algorithm will have of detecting the reflection artifact.

In some such embodiments, the second (e.g., HDR) camera need not be as high resolution as the first camera, as it may be specially configured to aid in the detection of unwanted reflection artifacts, and it may not be intended (or ever occur) that a user would save/store any images captured by the second camera to long-term/non-volatile memory.

Next, at step 675, the method 670 may detect, in the second image, an estimated location of one or more light sources, wherein each of the one or more light sources meets a set of one or more light source criteria. Various possible light source criteria have been described above, e.g., with reference to step 606.

Next, at step 676, the method 670 may, for each of the one or more light sources detected in the second image, perform the following operation at step 677: determine a candidate location in the first image of an unwanted reflection of the respective light source detected in the second image, wherein the candidate location is determined based, at least in part, on the estimated location of the respective light source detected in the second image (and, optionally, on one or more characteristics of the respective light source). Various possible ways of determining the possible locations of unwanted reflection artifacts in the first image have been described above, e.g., with reference to step 610.

Finally, at step 678, the method 670 may repair at least one unwanted reflection in the first image by modifying pixels in the first image at the determined candidate location of the respective at least one unwanted reflection (e.g., modifying the pixels values in the image at the location of the unwanted reflection using image-based heuristics or by using a trained artifact repair neural network, etc.).

Figure 6E:
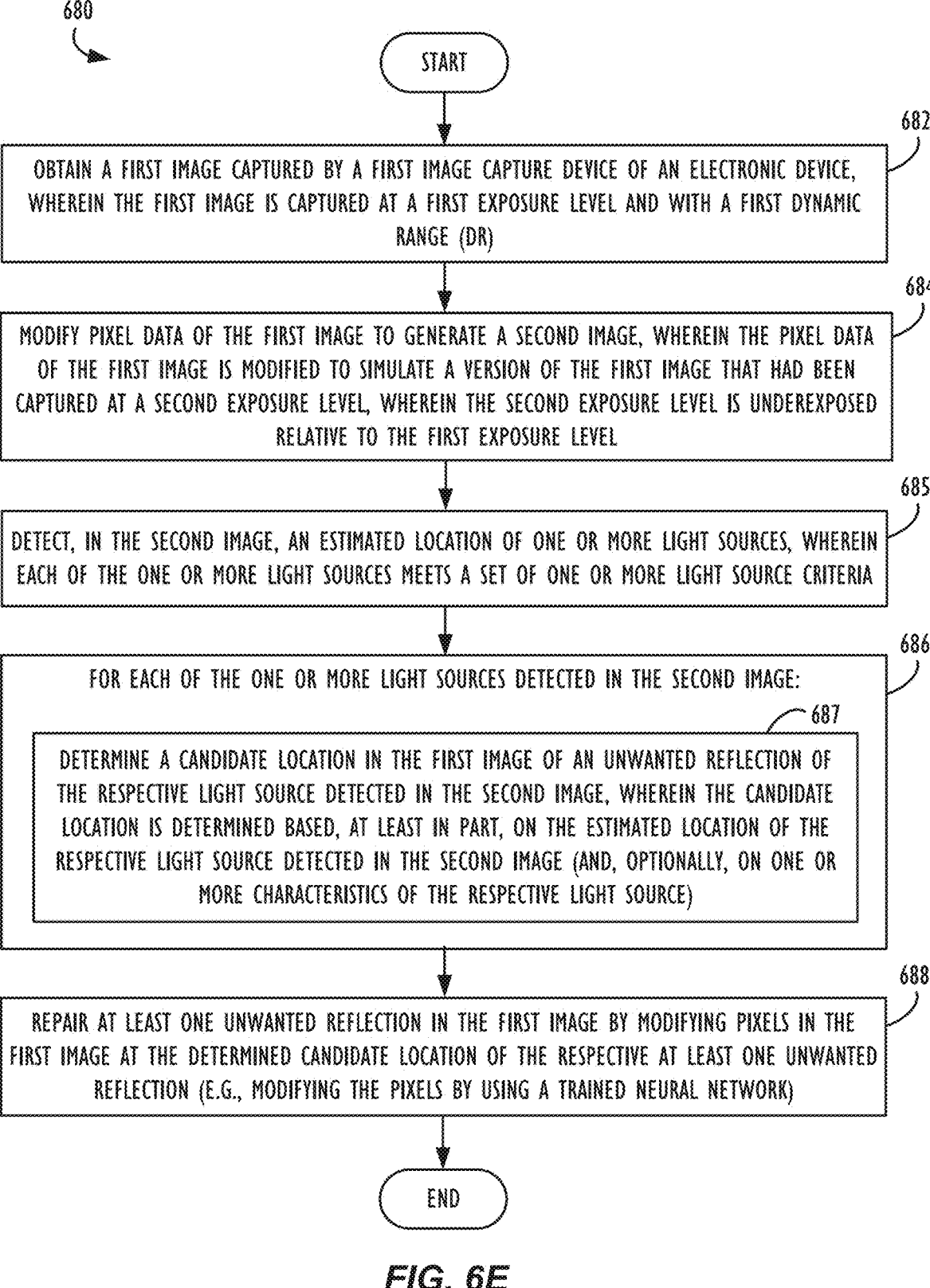
FIG. 6E is a flow chart illustrating an exemplary method of performing unwanted reflection artifact mitigation in video image streams captured by a single camera whose output is modified to simulate an underexposed version of the captured image, according to one or more embodiments.

FIG. 6E is a flow chart illustrating an exemplary method 680 of performing unwanted reflection artifact mitigation in video image streams captured by a single camera whose output is modified to simulate an underexposed version of the captured image, according to one or more embodiments.

First, at step 682, the exemplary method 680 may obtain a first image captured by a first image capture device of an electronic device, wherein the first image is captured at a first exposure level and with a first dynamic range (DR). As described above, the first image in method 680 may be captured by an HDR camera (e.g., greater than 8-bit depth), such as a camera using a LOFIC CMOS image sensor, a SPAD sensor, or even a PF-SPAD sensor.

Next, at step 684, the method 680 may modify pixel data of the first image to generate a second image, wherein the pixel data of the first image is modified to simulate a version of the first image that had been captured at a second exposure level, wherein the second exposure level is under-exposed relative to the first exposure level. According to some embodiments of exemplary method 680, a first camera device may take a single HDR capture that is then modified at step 684, such that the manipulated version of the data is equivalent (i.e., subject to any motion artifacts) to the data that would be captured in an underexposed, i.e., EV-N, image, such as described above with reference to the other EV0/EV-N multi-image capture embodiments described herein. For example, if it is desired to take an EV0 image and simulate the data that would be captured by an equivalent EV-8 image, the method may divide the pixel counts from the EV0 image by $2^{8}$ (i.e., 256), resulting in an equivalent photon accumulation count that may be expected if the camera were stopped down eight stops (i.e., capturing a separate EV-8 image).

Next, at step 685, the method 680 may detect, in the second image, an estimated location of one or more light sources, wherein each of the one or more light sources meets a set of one or more light source criteria.

Next, at step 686, the method 680 may, for each of the one or more light sources detected in the second image, perform the following operation at step 687: determine a candidate location in the first image of an unwanted reflection of the respective light source detected in the second image, wherein the candidate location is determined based, at least in part, on the estimated location of the respective light source detected in the second image (and, optionally, on one or more characteristics of the respective light source). Various possible ways of determining the possible locations of unwanted reflection artifacts in the first image have been described above, e.g., with reference to step 610.

Various possible light source criteria have been described above, e.g., with reference to step 606. In some embodiments, prior to determining the candidate locations in the first image of the unwanted reflections of each of the one or more light sources detected in the second image at step 687, the method 680 may clip the captured pixel data of the first image at a first predetermined level. For example, according to some such embodiments, each recorded pixel value from the captured HDR image may be broken out into a distinct EV0 image frame and an equivalent EV-N image frame before proceeding with Steps 685 et seq.

Finally, at step 688, the method 680 may repair at least one unwanted reflection in the first image by modifying pixels in the first image at the determined candidate location of the respective at least one unwanted reflection (e.g., modifying the pixels values in the image at the location of the unwanted reflection using image-based heuristics or by using a trained artifact repair neural network, etc.).

Exemplary Electronic Computing Devices

Figure 7:
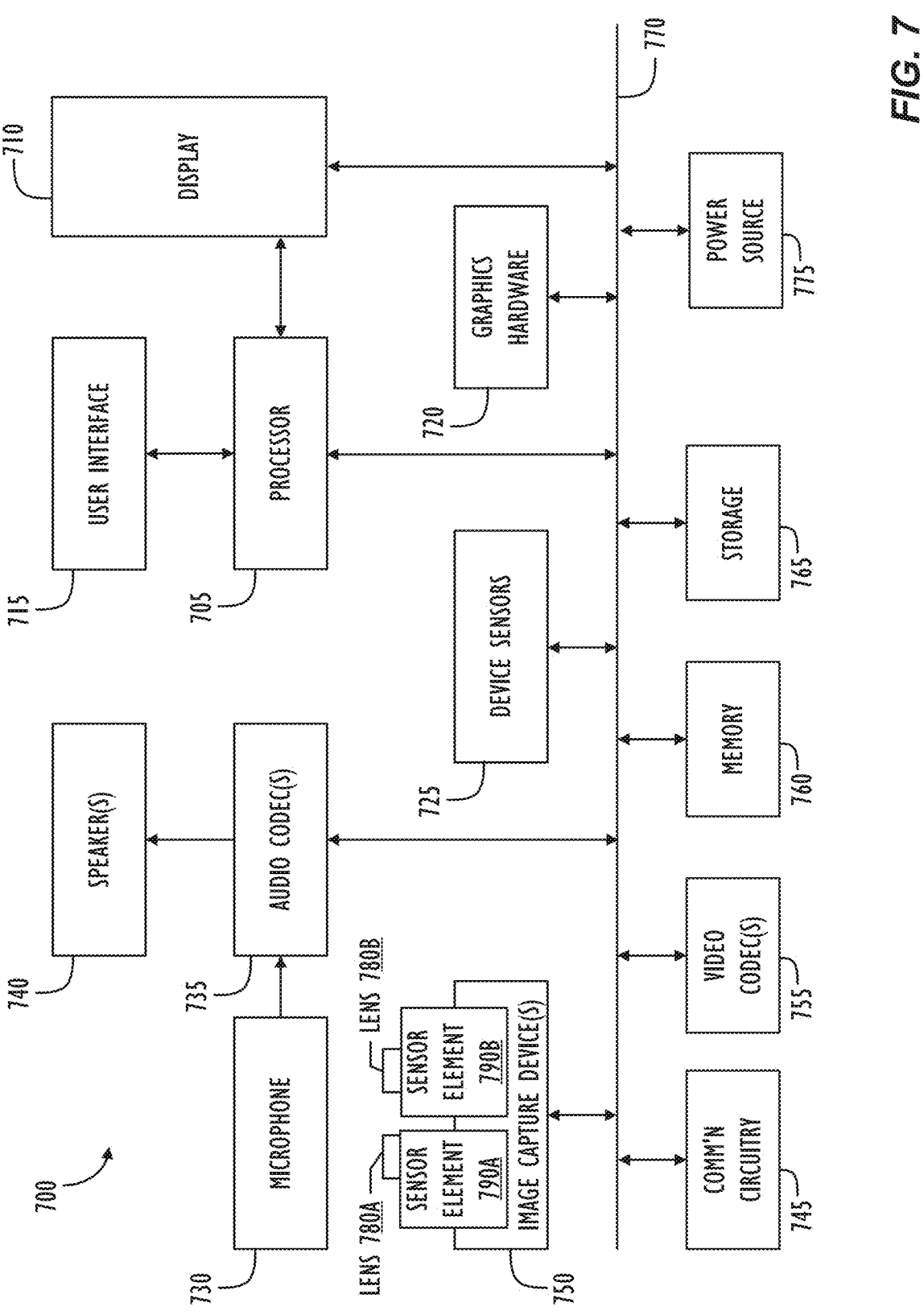
FIG. 7 is a block diagram illustrating a programmable electronic computing device, in which one or more of the techniques disclosed herein may be implemented.

Referring now to FIG. 7, a simplified functional block diagram of illustrative programmable electronic computing device 700 is shown according to one embodiment. Electronic device 700 could be, for example, a mobile telephone, personal media device, portable camera, or a tablet, notebook or desktop computer system. As shown, electronic device 700 may include processor 705, display 710, user interface 715, graphics hardware 720, device sensors 725 (e.g., proximity sensor/ambient light sensor, accelerometer, inertial measurement unit, and/or gyroscope), microphone 730, audio codec(s) 735, speaker(s) 740, communications circuitry 745, image capture device(s) 750, which may, e.g., comprise multiple camera units/optical image sensors having different characteristics or abilities (e.g., Still Image Stabilization (SIS), high dynamic range (HDR), optical image stabilization (OIS) systems, optical zoom, digital zoom, etc.), video codec(s) 755, memory 760, storage 765, and communications bus 770.

Processor 705 may execute instructions necessary to carry out or control the operation of many functions performed by electronic device 700 (e.g., such as the generation and/or processing of images in accordance with the various embodiments described herein). Processor 705 may, for instance, drive display 710 and receive user input from user interface 715. User interface 715 can take a variety of forms, such as a button, keypad, dial, a click wheel, keyboard, display screen and/or a touch screen. User interface 715 could, for example, be the conduit through which a user may view a captured video stream and/or indicate particular image frame(s) that the user would like to capture (e.g., by clicking on a physical or virtual button at the moment the desired image frame is being displayed on the device's display screen). In one embodiment, display 710 may display a video stream as it is captured while processor 705 and/or graphics hardware 720 and/or image capture circuitry contemporaneously generate and store the video stream in memory 760 and/or storage 765. Processor 705 may be a system-on-chip (SOC) such as those found in mobile devices and include one or more dedicated graphics processing units (GPUs). Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 perform computational tasks. In one embodiment, graphics hardware 720 may include one or more programmable graphics processing units (GPUs) and/ or one or more specialized SOCs, e.g., an SOC specially designed to implement neural network and machine learning operations (e.g., convolutions) in a more energy-efficient manner than either the main device central processing unit (CPU) or a typical GPU, such as Apple's Neural Engine processing cores.

Image capture device(s) 750 may comprise one or more camera units configured to capture images, e.g., images which may be processed to generate enhanced versions of said captured images, e.g., in accordance with this disclosure. Image capture device(s) 750 may include two (or more) lens assemblies 780A and 780B, where each lens assembly may have a separate focal length. For example, lens assembly 780A may have a shorter focal length relative to the focal length of lens assembly 780B. Each lens assembly may have a separate associated sensor element, e.g., sensor elements 790A/790B. Alternatively, two or more lens assemblies may share a common sensor element. Image capture device(s) 750 may capture still and/or video images. Output from image capture device(s) 750 may be processed, at least in part, by video codec(s) 755 and/or processor 705 and/or graphics hardware 720, and/or a dedicated image processing unit or image signal processor incorporated within image capture device(s) 750. Images so captured may be stored in memory 760 and/or storage 765.

Memory 760 may include one or more different types of media used by processor 705, graphics hardware 720, and image capture device(s) 750 to perform device functions. For example, memory 760 may include memory cache, read-only memory (ROM), and/or random access memory (RAM). Storage 765 may store media (e.g., audio, image and video files), computer program instructions or software, preference information, device profile information, and any other suitable data. Storage 765 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 760 and storage 765 may be used to retain computer program instructions or code organized into one or more modules and written in any desired computer programming language. When executed by, for example, processor 705, such computer program code may implement one or more of the methods or processes described herein. Power source 775 may comprise a rechargeable battery (e.g., a lithium-ion battery, or the like) or other electrical connection to a power supply, e.g., to a mains power source, that is used to manage and/or provide electrical power to the electronic components and associated circuitry of electronic device 700.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A method of repairing unwanted reflections in digital images, comprising:

obtaining a first image captured by a first image capture device of an electronic device, wherein the first image is captured at a first exposure level;

obtaining a second image captured by the first image capture device, wherein the second image is captured at a second exposure level, and wherein the second exposure level is underexposed relative to the first exposure level;

detecting, in the second image, an estimated location of one or more light sources, wherein each of the one or more light sources meets a set of one or more light source criteria;

for each of the one or more light sources detected in the second image:

determining a candidate location in the first image of an unwanted reflection of the respective light source detected in the second image, wherein the candidate location is determined based, at least in part, on the estimated location of the respective light source detected in the second image; and repairing at least one unwanted reflection in the first image by modifying pixels in the first image at the determined candidate location of the respective at least one unwanted reflection.

2. The method of claim 1, wherein determining a candidate location in the first image of an unwanted reflection of the respective light source detected in the second image further comprises:

mirroring the estimated location of the respective light source detected in the second image across a principal point of a lens of the first image capture device.

3. The method of claim 1, wherein the first exposure level comprises an EV0 exposure level and the second exposure level comprises an EV-exposure level.

4. The method of claim 3, wherein the second exposure level is in the range of EV-10 to EV-5.

5. The method of claim 1, wherein the first image and the second image are captured concurrently on a first image sensor of the first image capture device by using interleaved exposure levels across the first image sensor.

6. The method of claim 1, wherein the second image is captured in immediate succession after the first image.

7. The method of claim 1, wherein determining a candidate location in the first image of an unwanted reflection of a respective light source detected in the second image further comprises:

determining one or more characteristics of the respective light source detected in the second image; and identifying the one or more characteristics of the respective light source at the candidate location in the first image.

8. The method of claim 1, wherein determining a candidate location in the first image of an unwanted reflection of a respective light source detected in the second image further comprises:

evaluating an amount of contrast enhancement that has been applied to the candidate location in the first image.

9. The method of claim 1, wherein repairing a first one of the at least one unwanted reflection in the first image comprises:

modifying color values of one or more pixels in the first image at the determined candidate location of the first unwanted reflection.

10. The method of claim 1, wherein repairing a first one of the at least one unwanted reflection in the first image comprises:

using a trained neural network to determine modifications to color values of one or more pixels in the first image at the determined candidate location of the first unwanted reflection.

11. The method of claim 1, further comprising:

detecting a presence of light flicker in the second image.

12. The method of claim 11, wherein, in response to detecting a presence of light flicker in the second image, the method further comprises:

determining a candidate location in the first image of an unwanted reflection of a light source based, at least in part, on a saturation level of pixels in the first image.

13. The method of claim 11, wherein, in response to detecting a presence of light flicker in the second image, the method further comprises:

obtaining a third image captured by the first image capture device, wherein at least a portion of the third image is captured at a third exposure level, and wherein the third exposure level is underexposed relative to the first exposure level and overexposed relative to the second exposure level;

detecting, in the third image, an estimated location of one or more light sources, wherein each of the one or more light sources meets a set of one or more light source criteria; and for each of the one or more light sources detected in the third image:

determining a candidate location in the first image of an unwanted reflection of the respective light source detected in the third image, wherein the candidate location is determined based, at least in part, on the estimated location of the respective light source detected in the third image.

14. The method of claim 11, wherein, in response to detecting a presence of light flicker in the second image, the method further comprises:

obtaining a third image captured by the first image capture device, wherein the third image is captured at the second exposure level, and wherein the first image capture device introduces a random amount of jitter into a timing of the capture of the third image;

detecting, in the third image, an estimated location of one or more light sources, wherein each of the one or more light sources meets a set of one or more light source criteria; and for each of the one or more light sources detected in the third image:

determining a candidate location in the first image of an unwanted reflection of the respective light source detected in the third image, wherein the candidate location is determined based, at least in part, on the estimated location of the respective light source detected in the third image.

15. The method of claim 11, wherein detecting the presence of light flicker in the second image comprises at least one of the following:

utilizing a flicker detector that is communicatively coupled to the first image capture device;

performing a luminance analysis on the second image;

performing a luminance analysis on the first image relative to the second image; or performing a luminance analysis on one or more images captured prior to the first image.

16. A method of repairing unwanted reflections in digital images, comprising:

obtaining a first image captured by a first image capture device of an electronic device, wherein the first image is captured at a first exposure level and has a first field of view (FOV);

obtaining a second image captured by a second image capture device, wherein the second image is captured at a second exposure level and has a second FOV, wherein the second exposure level is underexposed relative to the first exposure level, and wherein the second FOV contains the first FOV;

detecting, in the second image, an estimated location of one or more light sources, wherein each of the one or more light sources meets a set of one or more light source criteria;

for each of the one or more light sources detected in the second image:

determining a candidate location in the first image of an unwanted reflection of the respective light source detected in the second image, wherein the candidate location is determined based, at least in part, on the estimated location of the respective light source detected in the second image; and repairing at least one unwanted reflection in the first image by modifying pixels in the first image at the determined candidate location of the respective at least one unwanted reflection.

17. The method of claim 16, wherein the first image and the second image are captured at a same moment in time.

18. The method of claim 16, wherein determining a candidate location in the first image of an unwanted reflection of the respective light source detected in the second image further comprises:

mirroring the estimated location of the respective light source detected in the second image across a principal point of a lens of the second image capture device; and mapping the mirrored estimated location of the respective light source detected in the second image into the first FOV.

19. The method of claim 16, wherein the first exposure level comprises an EV0 exposure level.

20. The method of claim 19, wherein the second exposure level comprises an EV-exposure level.

21. The method of claim 16, wherein determining a candidate location in the first image of an unwanted reflection of a respective light source detected in the second image further comprises:

determining one or more characteristics of the respective light source detected in the second image; and identifying the one or more characteristics of the respective light source at the candidate location in the first image.

22. The method of claim 16, wherein determining a candidate location in the first image of an unwanted reflection of a respective light source detected in the second image further comprises:

evaluating an amount of contrast enhancement that has been applied to the candidate location in the first image.

23. The method of claim 16, wherein repairing a first one of the at least one unwanted reflection in the first image comprises:

modifying color values of one or more pixels in the first image at the determined candidate location of the first unwanted reflection.

24. The method of claim 16, wherein repairing a first one of the at least one unwanted reflection in the first image comprises:

using a trained neural network to determine modifications to color values of one or more pixels in the first image at the determined candidate location of the first unwanted reflection.

25. The method of claim 16, further comprising:
detecting a presence of light flicker in the second image.

26. The method of claim 25, wherein, in response to detecting a presence of light flicker in the second image, the method further comprises:

determining a candidate location in the first image of an unwanted reflection of a light source based, at least in part, on a saturation level of pixels in the first image.

27. The method of claim 25, wherein, in response to detecting a presence of light flicker in the second image, the method further comprises:

obtaining a third image captured by the second image capture device, wherein at least a portion of the third image is captured at a third exposure level, and wherein the third exposure level is underexposed relative to the first exposure level and overexposed relative to the second exposure level;

detecting, in the third image, an estimated location of one or more light sources, wherein each of the one or more light sources meets a set of one or more light source criteria; and for each of the one or more light sources detected in the third image:

determining a candidate location in the first image of an unwanted reflection of the respective light source detected in the third image, wherein the candidate location is determined based, at least in part, on the estimated location of the respective light source detected in the third image.

28. The method of claim 25, wherein, in response to detecting a presence of light flicker in the second image, the method further comprises:

obtaining a third image captured by the second image capture device, wherein the third image is captured at the second exposure level, and wherein the second image capture device introduces a random amount of jitter into a timing of the capture of the third image;

detecting, in the third image, an estimated location of one or more light sources, wherein each of the one or more light sources meets a set of one or more light source criteria; and for each of the one or more light sources detected in the third image:

determining a candidate location in the first image of an unwanted reflection of the respective light source detected in the third image, wherein the candidate location is determined based, at least in part, on the estimated location of the respective light source detected in the third image.

29. The method of claim 25, wherein detecting the presence of light flicker in the second image comprises at least one of the following:

utilizing a flicker detector that is communicatively coupled to the second image capture device;

performing a luminance analysis on the second image;

performing a luminance analysis on the first image relative to the second image; or performing a luminance analysis on one or more images captured prior to the first image.

30. A method of repairing unwanted reflections in digital images, comprising:

obtaining a first image captured by a first image capture device of an electronic device, wherein the first image capture device has a first dynamic range (DR), and wherein the first image is captured at a first exposure level;

obtaining a second image captured by a second image capture device, wherein the second image capture device has a second DR that is greater than the first DR, wherein the second image is captured at a second exposure level;

detecting, in the second image, an estimated location of one or more light sources, wherein each of the one or more light sources meets a set of one or more light source criteria;

for each of the one or more light sources detected in the second image:

determining a candidate location in the first image of an unwanted reflection of the respective light source detected in the second image, wherein the candidate location is determined based, at least in part, on the estimated location of the respective light source detected in the second image; and repairing at least one unwanted reflection in the first image by modifying pixels in the first image at the determined candidate location of the respective at least one unwanted reflection.

31. The method of claim 30, wherein a resolution of the first image is greater than a resolution of the second image.

32. The method of claim 30, wherein a bit depth of the second image is greater than a bit depth of the first image.

33. The method of claim 30, wherein the second image capture device comprises: an image sensor with a lateral overflow integration capacitor (LOFIC) architecture; a single-photon avalanche diode (SPAD) sensor; or a passive free-running SPAD (PF-SPAD).

34. The method of claim 32, wherein the first image capture device comprises: an image sensor with a lateral overflow integration capacitor (LOFIC) architecture; a single-photon avalanche diode (SPAD) sensor; or a passive free-running SPAD (PF-SPAD).

35. The method of claim 32, further comprising:

clipping the pixel data of the first image at a first predetermined level prior to determining the candidate locations in the first image of the unwanted reflections of each of the one or more light sources detected in the second image.

36. A method of repairing unwanted reflections in digital images, comprising:

obtaining a first image captured by a first image capture device of an electronic device, wherein the first image is captured at a first exposure level and with a first dynamic range (DR);

modifying pixel data of the first image to generate a second image, wherein the pixel data of the first image is modified to simulate a version of the first image that had been captured at a second exposure level, wherein the second exposure level is underexposed relative to the first exposure level;

detecting, in the second image, an estimated location of one or more light sources, wherein each of the one or more light sources meets a set of one or more light source criteria;

for each of the one or more light sources detected in the second image:

determining a candidate location in the first image of an unwanted reflection of the respective light source detected in the second image, wherein the candidate location is determined based, at least in part, on the estimated location of the respective light source detected in the second image; and repairing at least one unwanted reflection in the first image by modifying pixels in the first image at the determined candidate location of the respective at least one unwanted reflection.

* * * * *